(12) United States Patent
Baba

(10) Patent No.: US 12,454,288 B2
(45) Date of Patent: Oct. 28, 2025

(54) PROCESSING METHOD, PROCESSING SYSTEM, AND STORAGE MEDIUM STORING PROCESSING PROGRAM

(71) Applicant: DENSO CORPORATION, Kariya (JP)

(72) Inventor: Atsushi Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 74 days.

(21) Appl. No.: 18/459,190

(22) Filed: Aug. 31, 2023

(65) Prior Publication Data

US 2023/0406355 A1 Dec. 21, 2023

Related U.S. Application Data

(63) Continuation of application No. PCT/JP2022/005111, filed on Feb. 9, 2022.

(30) Foreign Application Priority Data

Mar. 5, 2021 (JP) .................................. 2021-035483

(51) Int. Cl.
*B60W 60/00* (2020.01)
*B60W 30/14* (2006.01)
(Continued)

(52) U.S. Cl.
CPC ...... *B60W 60/0015* (2020.02); *B60W 30/143* (2013.01); *B60W 40/105* (2013.01);
(Continued)

(58) Field of Classification Search
CPC ............ B60W 30/143; B60W 40/105; B60W 40/107; B60W 50/04; B60W 60/00;
(Continued)

(56) References Cited

U.S. PATENT DOCUMENTS 10,074,279 B1 * 9/2018 Xu ........................ B60W 40/12
11,370,424 B1 * 6/2022 Cohen .................... G06V 10/25
(Continued)

FOREIGN PATENT DOCUMENTS

EP 4026745 A1 * 7/2022 ...... B60W 30/18159
GB 2600785 A * 5/2022 ........... G01S 7/4802
(Continued)

*Primary Examiner* — Atul Trivedi
(74) *Attorney, Agent, or Firm* — Maschoff Brennan

(57) ABSTRACT

A processing method for performing processing related to driving control of a host vehicle includes: acquiring detection information describing a state detected in a traveling environment of the host vehicle; determining a situation to be monitored for the host vehicle based on the detection information; setting a safety envelope based on the detection information to include defining a physics based boundary, margin, or buffer area around the host vehicle; monitoring a violation of the safety envelope based on a comparison between the safety envelope and a positional relationship between the host vehicle and a target moving object; and determining a rule for setting the safety envelope, which includes a restriction rule to be applied when an application condition is satisfied and a standard rule to be applied when the application condition is not satisfied, based on a determination result of whether the application condition is satisfied.

15 Claims, 23 Drawing Sheets

(51) Int. Cl.
*B60W 40/105* (2012.01)
*B60W 40/107* (2012.01)

(52) U.S. Cl.
CPC .............. *B60W 40/107* (2013.01); *B60W 2554/4041* (2020.02); *B60W 2554/80* (2020.02); *B60W 2555/60* (2020.02)

(58) Field of Classification Search
CPC ..... B60W 60/0015; B60W 2050/0088; B60W 2520/105; B60W 2554/4041; B60W 2554/80; B60W 2554/801; B60W 2554/802; B60W 2555/60; B60W 2720/10; B60W 2720/106; B60W 2754/20; B60W 2754/30; G08G 1/097; G08G 1/16
USPC .......................................................... 701/23
See application file for complete search history.

(56) References Cited

U.S. PATENT DOCUMENTS

| | | | |
|---|---|---|---|
| 12,182,878 B2 * | 12/2024 | Shalev-Shwartz | G01C 21/3602 |
| 2009/0326751 A1 | 12/2009 | Otake et al. | |
| 2015/0158486 A1 | 6/2015 | Healey et al. | |
| 2020/0043326 A1 | 2/2020 | Tao et al. | |
| 2020/0132488 A1 * | 4/2020 | Slutskyy | G05B 13/021 |
| 2020/0189591 A1 * | 6/2020 | Mellinger, III | B62D 6/003 |
| 2020/0377090 A1 * | 12/2020 | Seccamonte | B60W 60/0011 |
| 2021/0041869 A1 * | 2/2021 | Meyer | G08G 1/0108 |
| 2021/0046924 A1 | 2/2021 | Caldwell et al. | |
| 2021/0053561 A1 * | 2/2021 | Beller | G08G 1/166 |
| 2021/0053569 A1 * | 2/2021 | Censi | G05D 1/617 |
| 2021/0055733 A1 * | 2/2021 | Beller | G05D 1/0088 |
| 2021/0061309 A1 | 3/2021 | Kawanai | |
| 2022/0080962 A1 * | 3/2022 | Bin-Nun | B60W 60/0015 |
| 2022/0126831 A1 * | 4/2022 | Foil | G08G 1/16 |
| 2022/0126876 A1 * | 4/2022 | Tebbens | B60W 60/0027 |
| 2022/0135029 A1 * | 5/2022 | Poubel Orenstein | B60W 30/0953 701/301 |
| 2022/0135075 A1 * | 5/2022 | Ng | G06V 20/56 701/301 |
| 2022/0219682 A1 * | 7/2022 | Ollis | B60W 30/18109 |
| 2022/0219716 A1 * | 7/2022 | McAlister | G08G 1/167 |
| 2024/0059302 A1 * | 2/2024 | Yaghoubi | G05B 17/02 |
| 2024/0190452 A1 * | 6/2024 | Mirkovic | G06V 20/58 |
| 2024/0253665 A1 * | 8/2024 | Gupta | B60W 30/095 |
| 2025/0002049 A1 * | 1/2025 | Tam | B60W 60/001 |
| 2025/0002056 A1 * | 1/2025 | Gyllenhammar | B60W 30/182 |

FOREIGN PATENT DOCUMENTS

| | | | | |
|---|---|---|---|---|
| GB | 2604425 A | * | 9/2022 | ........ B60W 30/146 |
| JP | 2018-045397 A | | 3/2018 | |
| WO | 2018/115963 A2 | | 6/2018 | |
| WO | 2019/180506 A2 | | 9/2019 | |
| WO | WO-2020035728 A2 | * | 2/2020 | ........ B60W 30/0953 |

* cited by examiner

FIG. 1

| Terms | Description |
|---|---|
| Levels of driving automation | Levels of driving automation may be defined as "mutually exclusive set of driving automation levels, ranging from Level 0 (no automation) to Level 5 (full automation), defining the roles of the driver or user and automation system in relation to each other". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Dynamic driving task (DDT) | Dynamic driving task may be defined as "real-time operational and tactical functions required to operate a vehicle in traffic". Dynamic driving task may be defined as "all of the real-time operational and tactical functions required to operate a vehicle in on-road traffic". |
| Takeover | Takeover may be define as "transfer of the driving task between the automated driving system and the driver". |
| Lagging measure | Lagging measure may be defined as "metrics that are assessed after deployment of an automated driving system and provides confirmation that the positive risk balance as well as conformance with the safety-by-design techniques have been achieved". Lagging measure may be defined as "metrics that are assessed after deployment of an automated driving system and provides confirmation that conformance with the safety-by-design has been achieved". Herein, safety may be defined with consideration of statistics or social acceptability other than absolute metrics. |
| Leading measure | Leading measure may be defined as "metrics that are derived from data that is assessed prior to deployment of an automated driving system indicating that the automated driving system conforms with safety-by-design techniques to achieve a positive risk balance and avoidance of unreasonable risk". Leading measure may be defined as "metrics that are derived from data that is assessed prior to deployment of an automated driving system indicating that the automated driving system conforms with safety-by-design to achieve avoidance of unreasonable risk". Herein, safety may be defined with consideration of statistics or social acceptability other than absolute metrics. |

FIG. 2

| Terms | Description |
|---|---|
| High definition map (HD map) | High definition map may be defined as "maps with high level precision mostly used in the context of automated driving system to give the vehicle precise information about the road environment". |
| Path planning | Path planning may be defined as "identification and selection of the vehicle trajectory for every defined time-step in response to the situational awareness, destination and other constraints". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Scenario | Scenario may be defined as "description of the temporal relationship between several scenes, with goals and values within a specified situation in a sequence of scenes influenced by actions and events". Scenario may be defined as "description of the consecutive time series of activities integrating the subject vehicle, all its external environment and their interactions in the process of performing a certain driving task". Scenario may be defined as "high level descriptions of common driving situations in which reasonable and foreseeable assumptions about the behavior of other road users shall be made". |
| Scene | Scene may be defined as "snapshot of the environment including the scenery, dynamic elements, and all actors and observers self-representations, and the relationships among those entities". Scene may be defined as "snapshot of the scenario at a given point of time". |
| Use case | Use case may be defined as "description of a suite of related scenarios". |
| Simulation | Simulation may be defined as "approximated imitation of selected behavioral characteristics of one physical or abstract system by a static or dynamic model". |

FIG. 3

| Terms | Description |
|---|---|
| Driving policy (DP) | Driving policy may be defined as "strategy and rules defining acceptable control actions at vehicle level". Driving policy may be decision-making level implementation of the vehicle level safety strategy (VLSS). Driving policy may be a mapping from a sensing state (a description of the world around us) into a driving command (e.g., the command is lateral and longitudinal accelerations for the coming second, which determines where and at what speed should the car be in one second from now). |
| Vehicle level safety strategy (VLSS) | VLSS may represent the set of requirements for the function under development used to support SOTIF related design, verification and validation activities. VLSS may be the overarching specification that ensure the overall AV safety. |
| Safety of the Intended functionality (SOTIF) | SOTIF may be defined as "absence of unreasonable risk due to these potentially hazardous behaviors related to such limitations". SOTIF may be defined as "absence of unreasonable risk due to hazards resulting from functional insufficiencies of the intended functionality or its implementation". SOTIF may be defined as "absence of unreasonable risk due to hazards resulting from functional insufficiencies of the intended functionality or by reasonably foreseeable misuse by road users". |
| Proper response | Proper response may be defined as "the set of corrective actions that the driving policy might require to maintain the SOTIF of an autonomous vehicle (AV) during nominal conditions". |
| Unreasonable risk | Unreasonable risk may be defined as "risk judged to be unacceptable in a certain context according to valid societal moral concepts". |
| Unreasonable situation | Unreasonable situation may be defined as "a situation where some other agent is not behaving reasonably per the assumptions used in the model". |
| Misuse | Misuse may be defined as "usage of the system by a human in a way not intended by the manufacturer or the service provider". |

FIG. 4

| Terms | Description |
|---|---|
| Safety envelope | The definition of a "safety envelope" may be a common concept that can be used to address all the principles that the driving policy might comply with. According to this concept, the autonomous vehicle might have one or more boundaries around the ego-vehicle, where the violation of one or more of these boundaries result in different responses by the autonomous vehicle.<br>Safety envelopes may define a physics based margin around the automated vehicle typically combined with defined assumptions about the reasonably foreseeable worst case behavior of others to provide a foundational building block of a safety-related model.<br>Safety envelope may be the basic construct for understanding if the autonomous vehicle is in a high risk scenario.<br>Safety envelope may be defined to demarcate boundaries, margins or buffer areas not only around the ego-vehicle but also around other vehicles, around pedestrians or around stationary objects. |
| DDT fallback | DDT fallback may be defined as "response by the driver or automation system to either perform the DDT or transition to a minimal risk condition after the occurrence of a failure(s) or detection of a functional insufficiency or upon detection of a potentially hazardous behavior".<br>DDT fallback may be defined as "takeover/fallback condition and schemes of transition control from autonomous to control by driver or other system with their relevant use cases". |
| Minimal risk condition (MRC) | Minimal risk condition may be defined as "vehicle state in order to reduce the risk of a harm, when a given trip cannot be completed".<br>Minimal risk condition may be defined as "condition to which a user or an automated driving system may bring a vehicle after performing the minimal risk maneuver in order to reduce the risk of a crash when a given trip cannot be completed". |
| Minimal risk maneuver (MRM) | Minimal risk maneuver may be defined as "automated driving system's capability of transitioning the vehicle between nominal and minimal risk conditions". |
| Degradation | Degradation may be defined as "state or transition to a state of the item or element with reduced functionality, performance, or both". |

FIG. 5

| Terms | Description |
|---|---|
| User | User may be defined as "general term referencing the human role in driving automation". |
| Fallback ready user | Fallback ready user may be defined as "user who is able to operate the vehicle and is capable of intervening to perform the DDT fallback as required and within a time span appropriate for the defined non-driving occupation". |
| Road user | Road user may be defined as "anyone who uses a road including sidewalk and other adjacent spaces". Road users may include pedestrians, cyclists, other VRUs, and vehicles (for example, human driven motor vehicles or ADS-equipped vehicles). |
| Vulnerable road user (VRU) | Vulnerable road user may be defined as "non-protected road user such as motorcyclists, cyclists, pedestrians and persons with disabilities or reduced mobility and orientation". |
| Non vulnerable road user | Non vulnerable road user may be defined as "protected road users such as users in other vehicles, trucks, construction and agricultural machines". |
| Other road user | Other road user may be defined as "vulnerable and non-vulnerable road users with no role in the ego automated vehicle". |
| Response time | Response time may be defined as "the time it takes for a road user to initiate an appropriate response (e.g., braking/steering/accelerating/stopping) due to a specific stimulus in a given scenario" |

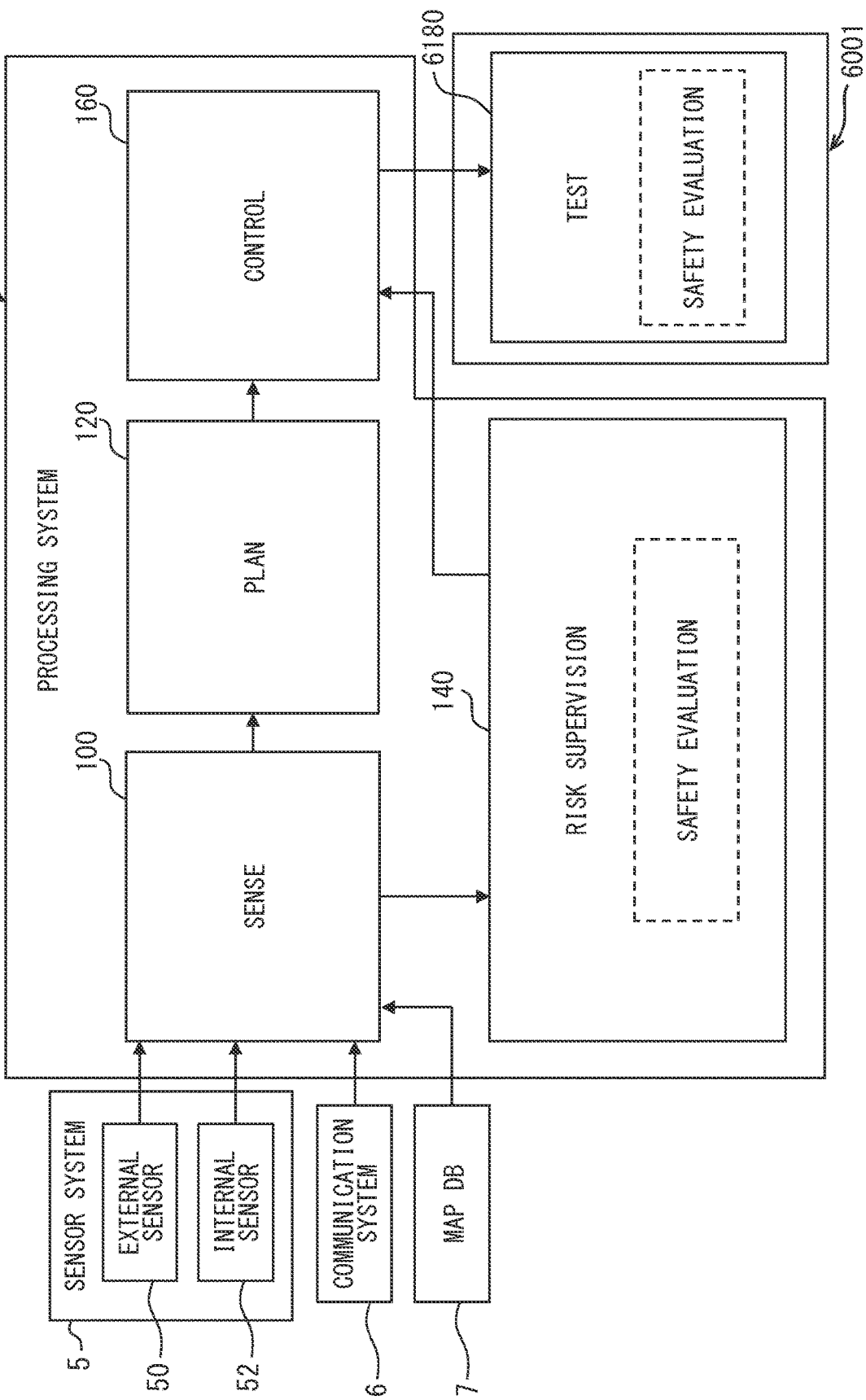

PROCESSING METHOD, PROCESSING SYSTEM, AND STORAGE MEDIUM STORING PROCESSING PROGRAM

CROSS REFERENCE TO RELATED APPLICATIONS

This application is a continuation application of International Patent Application No. PCT/JP2022/005111 filed on Feb. 9, 2022, which designated the U.S. and claims the benefit of priority from Japanese Patent Application No. 2021-035483 filed on Mar. 5, 2021. The entire disclosure of the above application is incorporated herein by reference.

TECHNICAL FIELD

The present disclosure relates to a processing technique for performing processing related to driving control of a host moving object.

BACKGROUND ART

Driving control related to a navigation operation of a host vehicle is planned according to detection information related to internal and external environments of the host vehicle. When it is determined that there is potential accident responsibility based on a safety model following a driving policy and the detection information, a constraint is given to the driving control.

SUMMARY

One aspect of the present disclosure is a processing method executed by a processor to perform processing related to driving control of a host vehicle. The processing method includes: acquiring detection information describing a state detected in a traveling environment of the host vehicle; determining a situation to be monitored for the host vehicle based on the detection information; setting a safety envelope based on the detection information to include defining a physics based boundary, margin, or buffer area around the host vehicle; monitoring a violation of the safety envelope based on a comparison between the safety envelope and a positional relationship between the host vehicle and a target moving object; and determining a rule for setting the safety envelope, which includes a restriction rule to be applied when an application condition is satisfied and a standard rule to be applied when the application condition is not satisfied, based on a determination result of whether the application condition is satisfied.

BRIEF DESCRIPTION OF DRAWINGS

FIG. 1 is a table illustrating explanations of terms in the present disclosure.
FIG. 2 is a table illustrating explanations of terms in the present disclosure.
FIG. 3 is a table illustrating explanations of terms in the present disclosure.
FIG. 4 is a table illustrating explanations of terms in the present disclosure.
FIG. 5 is a table illustrating explanations of terms in the present disclosure.
FIG. 15 is a diagram illustrating a virtual target vehicle assumed at a far point Pf in a detection range As.
FIG. 16 is a diagram illustrating a virtual target vehicle assumed at the far point Pf in the detection range As.
FIG. 32 is a block diagram illustrating the processing system according to the sixth embodiment.

DESCRIPTION OF EMBODIMENTS

Figure 6:
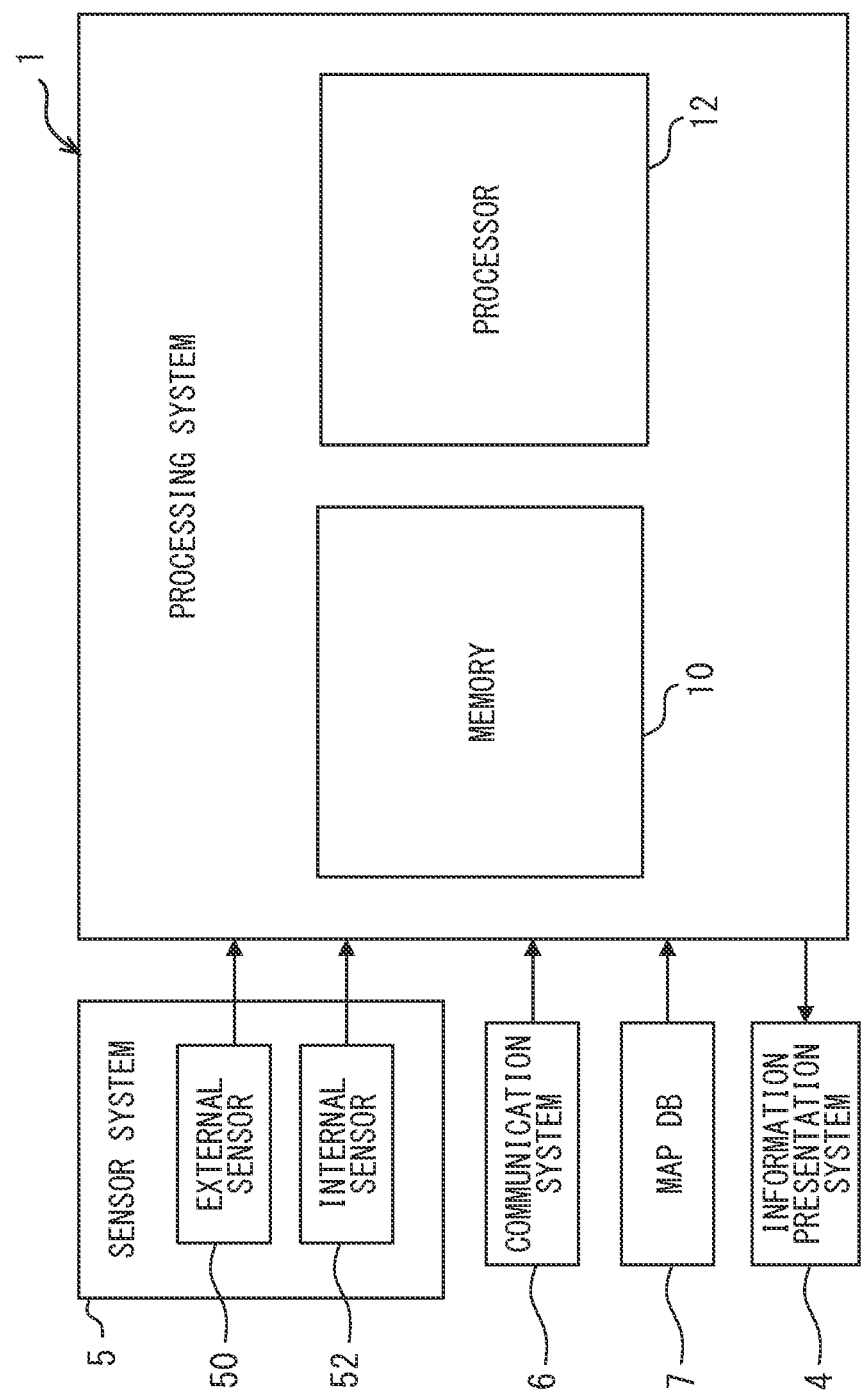
FIG. 6 is a block diagram illustrating a processing system according to a first embodiment.

To begin with, a relevant technology will be described first only for understanding the following embodiments.
One of objectives of the present disclosure is to provide a novel technique related to driving control of a host vehicle.
A first aspect of the present disclosure is a processing method executed by a processor to perform processing related to driving control of a host vehicle. The processing method includes: acquiring detection information describing a state detected in a traveling environment of the host vehicle; determining a situation to be monitored for the host vehicle based on the detection information; setting a safety envelope based on the detection information to include defining a physics based boundary, margin, or buffer area around the host vehicle; monitoring a violation of the safety envelope based on a comparison between the safety envelope and a positional relationship between the host vehicle and a target moving object; and determining a rule for setting the safety envelope, which includes a restriction rule to be applied when an application condition is satisfied and a standard rule to be applied when the application condition is not satisfied, based on a determination result of whether the application condition is satisfied.

A second aspect of the present disclosure is a processing method executed by a processor to perform processing related to driving control of a host vehicle. The processing method includes: acquiring detection information describing a state detected in a traveling environment of the host vehicle; determining a situation to be monitored for the host vehicle based on the detection information; setting a safety envelope based on the detection information to include defining a physics based boundary, margin, or buffer area around the host vehicle; setting a limit value for an acceleration based on the safety envelope and a positional relationship between the host vehicle and a target vehicle; and monitoring a violation of the safety envelope based on a comparison between the limit value for the acceleration and an acceleration of the host vehicle and a comparison between a speed of the host vehicle and a limit value for the speed. At least one of the limit value for the acceleration and the limit value for the speed is a limit value for traveling in compliance with a regulation set for road traveling.

A third aspect of the present disclosure is a processing system that performs processing related to driving control of a host vehicle. The processing system includes: a processor that is configured to: acquire detection information describing a state detected in a traveling environment of the host vehicle); determine a situation to be monitored for the host vehicle based on the detection information; set a safety envelope based on the detection information to include defining a physics based boundary, margin, or buffer area around the host vehicle; monitor a violation of the safety envelope based on a comparison between the safety envelope and a positional relationship between the host vehicle and a target moving object; and determine a rule for setting the safety envelope, which includes a restriction rule to be applied when an application condition is satisfied and a standard rule to be applied when the application condition is not satisfied, based on a determination result of whether the application condition is satisfied.

A fourth aspect of the present disclosure is a processing system that performs processing related to driving control of a host vehicle. The processing system includes: a processor that is configured to: acquire detection information describing a state detected in a traveling environment of the host vehicle; determine a situation to be monitored for the host vehicle based on the detection information; set a safety envelope based on the detection information to include defining a physics based boundary, margin, or buffer area around the host vehicle; set a limit value for an acceleration based on the safety envelope and a positional relationship between the host vehicle and a target vehicle; and monitor a violation of the safety envelope based on a comparison between the limit value for the acceleration and an acceleration of the host vehicle and a comparison between a speed of the host vehicle and a limit value for the speed. At least one of the limit value for the acceleration and the limit value for the speed is a limit value for traveling in compliance with a regulation set for road traveling.

A fifth aspect of the present disclosure is a processing program stored in a storage medium. The processing program includes an instruction to be executed by a processor to perform processing related to driving control of a host vehicle. The instruction includes: acquiring detection information describing a state detected in a traveling environment of the host vehicle; determining a situation to be monitored for the host vehicle based on the detection information; setting a safety envelope based on the detection information to include defining a physics based boundary, margin, or buffer area around the host vehicle; monitoring a violation of the safety envelope based on a comparison between the safety envelope and a distance between the host vehicle and a target moving object; and determining a rule for setting the safety envelope, which includes a restriction rule to be applied when an application condition is satisfied and a standard rule to be applied when the application condition is not satisfied, based on a determination result of whether the application condition is satisfied.

A sixth aspect of the present disclosure is a processing program stored in a storage medium. The processing program includes an instruction to be executed by a processor to perform processing related to driving control of a host vehicle. The instruction includes: acquiring detection information describing a state detected in a traveling environment of the host vehicle; determining a situation to be monitored for the host vehicle based on the detection information; setting a safety envelope based on the detection information to include defining a physics based boundary, margin, or buffer area around the host vehicle; and setting a limit value for an acceleration based on the safety envelope and a distance between the host vehicle and a target vehicle; and monitoring a violation of the safety envelope based on a comparison between the limit value for the acceleration and an acceleration of the host vehicle and a comparison between a speed of the host vehicle and a limit value for the speed. At least one of the limit value for the acceleration and the limit value for the speed is a limit value for traveling in compliance with a regulation set for road traveling.

According to first, third, and fifth embodiments, since a rule for setting a safety envelope is determined based on whether an application condition is satisfied, it is possible to set an appropriate safety envelope and monitor a violation of the safety envelope.

According to second, fourth, and sixth embodiments, the host vehicle can travel in compliance with a regulation.

Next, multiple embodiments according to the present disclosure will be described with reference to the drawings. Duplicate description may be omitted by assigning the same reference numerals to corresponding configuration elements in each embodiment. When only a part of a configuration is described in each embodiment, configurations of the other embodiments described above can be applied to the other parts of the configuration. Further, not only the combinations of the configurations explicitly specified in the description of each embodiment, but also the configurations of the multiple embodiments can be partially combined even if they are not explicitly specified unless there is a particular problem with the combination.

FIGS. 1 to 5 illustrate explanations of terms associated with each embodiment according to the present disclosure. However, definitions of terms are not interpreted as being limited to the explanations illustrated in FIGS. 1 to 5, and are interpreted without departing from the gist of the present disclosure.

First Embodiment

A processing system 1 according to a first embodiment illustrated in FIG. 6 performs processing related to driving control of a host moving object (hereinafter, referred to as driving control processing). From a viewpoint of a host vehicle 2, the host vehicle 2 can also be said to be an ego-vehicle. The host moving object subjected to the driving control processing by the processing system 1 is the host vehicle 2 illustrated in FIG. 7. The host vehicle 2 can be said to be an ego-vehicle for the processing system 1 when, for example, the entire processing system 1 is mounted on the host vehicle 2.

In the host vehicle 2, autonomous driving is executed. The autonomous driving is classified into levels according to the degree of manual intervention by an occupant in a dynamic driving task (hereinafter, referred to as DDT). The autonomous driving may be implemented by autonomous traveling control in which a system executes all DDTs when operated, such as conditional driving automation, advanced driving automation, or full driving automation. The autonomous driving may be implemented in advanced driver-assistance control in which a driver as an occupant executes some or all DDTs, such as driver-assistance or partial driving automation. The autonomous driving may be implemented by either one, a combination, or switching of the autonomous traveling control and the advanced driver-assistance control.

Figure 7:
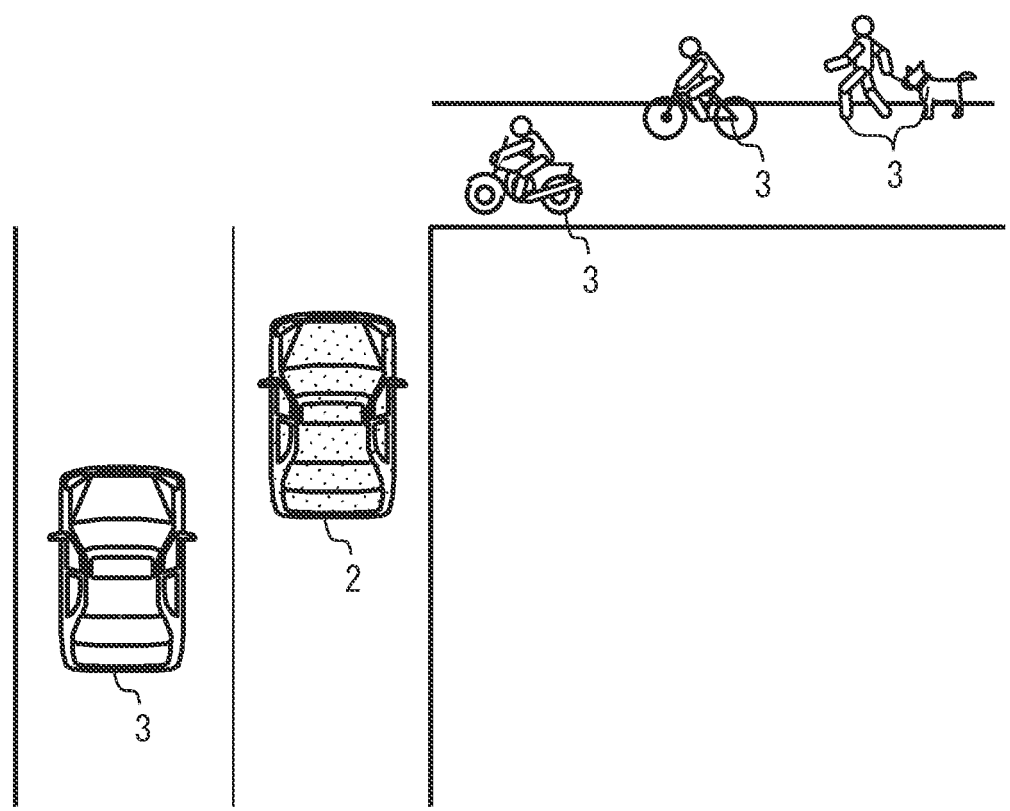
FIG. 7 is a schematic diagram illustrating a traveling environment of a host vehicle to which the first embodiment is applied.
Figure 8:
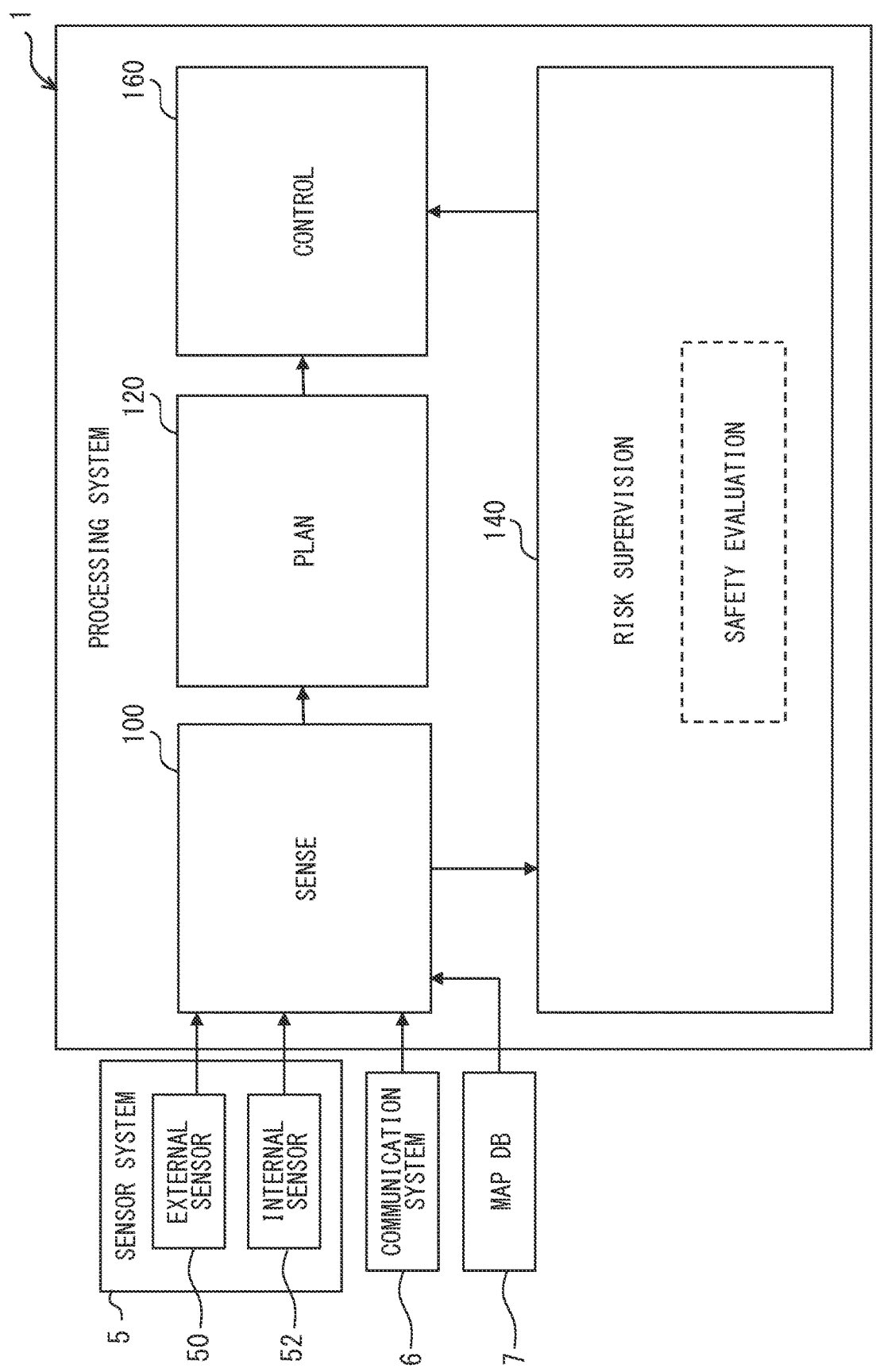
FIG. 8 is a block diagram illustrating the processing system according to the first embodiment.

A sensor system 5, a communication system 6, a map data base (DB) 7, and an information presentation system 4 illustrated in FIGS. 6 and 8 are mounted on the host vehicle 2. The sensor system 5 acquires sensor data that can be used by the processing system 1 by detecting an outside and an inside of the host vehicle 2. Therefore, the sensor system 5 includes an external sensor 50 and an internal sensor 52.

The external sensor 50 may detect a target present in the outside of the host vehicle 2. The target detection type external sensor 50 is at least one of, for example, a camera, a light detection and ranging/laser imaging detection and ranging (LIDAR), a laser radar, a millimeter wave radar, and an ultrasonic sonar. The external sensor 50 may detect a state of atmosphere in the outside of the host vehicle 2. The atmosphere detection type external sensor 50 is at least one of, for example, an outside air temperature sensor and a humidity sensor.

The internal sensor 52 may detect a specific physical quantity related to vehicle motion (hereinafter referred to as a motion physical quantity) in the inside of the host vehicle 2. The physical quantity detection type internal sensor 52 is at least one of, for example, a speed sensor, an acceleration sensor, and a gyro sensor. The internal sensor 52 may detect a state of an occupant in the inside of the host vehicle 2. The occupant detection type internal sensor 52 is, for example, at least one of an actuator sensor, a driver status monitor, a biological sensor, a seating sensor, an in-vehicle device sensor, and the like. In particular, as the actuator sensor, at least one of, for example, an accelerator sensor, a brake sensor, and a steering sensor that detect an operating state of an occupant related to a motion actuator of the host vehicle 2 is used.

The communication system 6 acquires communication data that can be used by the processing system 1 by wireless communication. The communication system 6 may receive a positioning signal from an artificial satellite of a global navigation satellite system (GNSS) present in the outside of the host vehicle 2. The positioning type communication system 6 is, for example, a GNSS receiver. The communication system 6 may transmit and receive a communication signal to and from a V2X system present in the outside of the host vehicle 2. The V2X type communication system 6 is at least one of, for example, a dedicated short range communications (DSRC) communication device and a cellular V2X (C-V2X) communication device. The communication system 6 may transmit and receive a communication signal to and from a terminal present in the inside of the host vehicle 2. The terminal communication type communication system 6 is at least one of, for example, a Bluetooth (registered trademark) device, a Wi-Fi (registered trademark) device, and an infrared communication device.

The map DB 7 stores map data that can be used by the processing system 1. The map DB 7 includes at least one non-transitory tangible storage medium among, for example, a semiconductor memory, a magnetic medium, and an optical medium. The map DB 7 may be a DB of a locator that estimates a self-state amount of the host vehicle 2 including a self-position. The map DB may be a DB of a navigation unit that navigates a travel path of the host vehicle 2. The map DB 7 may be constructed by a combination of multiple DBs.

The map DB 7 acquires and stores latest map data by, for example, communicating with an external center via the V2X type communication system 6. The map data is two-dimensionally or three-dimensionally digitalized as data representing a traveling environment of the host vehicle 2. As the three-dimensional map data, digital data of a high definition map may be used. The map data may include road data representing at least one of, for example, a position coordinate, a shape, and a road surface condition of a road structure. The map data may include marking data representing at least one of, for example, a traffic sign, a road display, and a position coordinate and a shape of a lane marking attached to a road. The marking data included in the map data may represent landmarks such as a traffic-control sign, an arrow marking, a lane marking, a stop line, a direction sign, a landmark beacon, a rectangular sign, a business sign, or a line pattern change of a road. The map data may include structure data representing at least one of, for example, position coordinates and shapes of a building and a traffic light facing a road. The marking data included in the map data may represent landmarks such as a street light, an edge of a road, a reflecting plate, a pole, or a back side of a road sign.

The information presentation system 4 presents notification information to occupants including the driver of the host vehicle 2. The information presentation system 4 includes a visual presentation unit, an auditory presentation unit, and a skin sense presentation unit. The visual presentation unit presents the notification information by stimulating a visual sense of the occupant. The visual presentation unit is at least one of, for example, a head-up display (HUD), a multi-function display (MFD), a combination meter, a navigation unit, and a light emitting unit. The auditory presentation unit presents the notification information by stimulating an auditory sense of the occupant. The auditory presentation unit is at least one of, for example, a speaker, a buzzer, and a vibration unit. The skin sense presentation unit presents the notification information by stimulating a skin sense of the occupant. The skin sense stimulated by the skin sense presentation unit includes at least one of, for example, a tactile sense, a temperature sense, and a wind sense. The skin sense presentation unit is at least one of, for example, a vibration unit of a steering wheel, a vibration unit of a driver's seat, a reaction force unit of the steering wheel, a reaction force unit of an accelerator pedal, a reaction force unit of a brake pedal, and an air conditioning unit.

As illustrated in FIG. 6, the processing system 1 is connected to the sensor system 5, the communication system 6, the map DB 7, and the information presentation system 4 via at least one of, for example, a local area network (LAN), a wire harness, an internal bus, and a wireless communication line. The processing system 1 includes at least one dedicated computer. The dedicated computer constituting the processing system 1 may be an integrated electronic control unit (ECU) that integrates driving control of the host vehicle 2. The dedicated computer constituting the processing system 1 may be a determination ECU that determines DDT in the driving control of the host vehicle 2. The dedicated computer constituting the processing system 1 may be a monitoring ECU that monitors the driving control of the host vehicle 2. The dedicated computer constituting the processing system 1 may be an evaluation ECU that evaluates the driving control of the host vehicle 2.

The dedicated computer constituting the processing system 1 may be a navigation ECU that navigates the travel path of the host vehicle 2. The dedicated computer constituting the processing system 1 may be a locator ECU that estimates the self-state amount including the self-position of the host vehicle 2. The dedicated computer constituting the processing system 1 may be an actuator ECU that controls the motion actuator of the host vehicle 2. The dedicated computer constituting the processing system 1 may be a human machine interface (HMI) control unit (HCU) that controls the information presentation in the host vehicle 2. The dedicated computer constituting the processing system 1 may be at least one external computer that constructs an external center or a mobile terminal capable of communicating via, for example, the communication system 6.

The dedicated computer constituting the processing system 1 includes at least one memory 10 and at least one processor 12. The memory 10 is at least one non-transitory tangible storage medium among, for example, a semiconductor memory, a magnetic medium, and an optical medium that temporarily stores a program, data, and the like that can be read by a computer. The processor 12 includes, as a core, at least one of, for example, a central processing unit (CPU), a graphics processing unit (GPU), and a reduced instruction set computer (RISC)-CPU.

The processor 12 executes multiple instructions included in a processing program stored in the memory 10 as software. Accordingly, the processing system 1 constructs multiple functional blocks for performing the driving control processing of the host vehicle 2. In this way, in the processing system 1, in order to perform the driving control processing of the host vehicle 2, the multiple functional blocks are constructed by the processing program stored in the memory 10 causing the processor 12 to execute the multiple instructions. As illustrated in FIG. 8, the multiple functional blocks constructed by the processing system 1 include a detection block 100, a planning block 120, a risk monitoring block 140, and a control block 160.

The detection block 100 acquires the sensor data from the external sensor 50 and the internal sensor 52 of the sensor system 5. The detection block 100 acquires the communication data from the communication system 6. The detection block 100 acquires the map data from the map DB 7. The detection block 100 detects internal and external environments of the host vehicle 2 by fusion using these acquired data as inputs. By detecting the internal and external environments, the detection block 100 generates detection information to be given to the subsequent planning block 120 and risk monitoring block 140. In this way, it can be said that when the detection information is generated, the detection block 100 acquires data from the sensor system 5 and the communication system 6, recognizes or interprets meaning of the acquired data, and integrates the acquired data to grasp situations including an external situation of the host vehicle 2, a situation in which the host vehicle 2 is placed, and an internal situation of the host vehicle 2. The detection block 100 may give substantially the same detection information to the planning block 120 and the risk monitoring block 140. The detection block 100 may give different detection information to the planning block 120 and the risk monitoring block 140.

The detection information generated by the detection block 100 describes a state detected for each scene in the traveling environment of the host vehicle 2. The detection block 100 may generate detection information on an object in the outside of the host vehicle 2 by detecting the object. The object may be a road user, an obstacle, and a structure. The detection information on the object may represent at least one of, for example, a distance to the object, a relative speed of the object, a relative acceleration of the object, and an estimated state by tracking detection of the object. The detection information on the object may further represent a type recognized or specified based on a state of the detected object. The detection block 100 may generate detection information on a traveling road on which the host vehicle 2 travels at present and in future by detecting the traveling road. The detection information on the traveling road may represent at least one state among, for example, a road surface, a lane, a road end, and a free space.

The detection block 100 may generate detection information on the self-state amount including the self-position of the host vehicle 2 by localization of estimating the self-state amount. The detection block 100 may generate update information on map data related to the traveling road of the host vehicle 2 at the same time as the detection information on the self-state amount, and feedback the update information to the map DB 7. The detection block 100 may generate detection information on a marking associated with the traveling road of the host vehicle 2 by detecting the marking. The detection information on the marking may represent at least one state of, for example, a sign, a lane marking, and a traffic light. The detection information on the marking may further represent a traffic rule recognized or specified based on the state of the marking. The detection block 100 may generate detection information on a weather situation for each scene in which the host vehicle 2 travels by detecting the weather situation. The detection block 100 may generate detection information on a time for each traveling scene of the host vehicle 2 by detecting the time.

The planning block 120 acquires the detection information from the detection block 100. The planning block 120 plans the driving control of the host vehicle 2 according to the acquired detection information. In the planning of the driving control, a control command related to a navigation operation of the host vehicle 2 and an assistance operation of the driver is generated. The control command generated by the planning block 120 may include a control parameter for controlling the motion actuator of the host vehicle 2. Examples of the motion actuator to which the control command is output include at least one of, for example, an internal combustion engine, an electric motor, a power train in which the internal combustion engine and the electric motor are combined, a brake device, and a steering device.

The planning block 120 may generate a control command so as to comply with a driving policy by using the driving policy and a safety model described following safety of the driving policy. The driving policy followed by the safety model is defined based on, for example, a vehicle level safety strategy that guarantees safety of the intended functionality (hereinafter referred to as SOTIF). In other words, the safety model is described by following the driving policy on which the vehicle level safety strategy is implemented and modeling the SOTIF. The planning block 120 may train the safety model by a machine learning algorithm that back-propagates a driving control result to the safety model. As the safety model to be trained, at least one learning model among, for example, deep learning by a neural network such as a deep-neural network (DNN) and reinforcement learning may be used.

The planning block 120 may plan a path to be traveled in the future by the host vehicle 2 by the driving control prior to generating the control command. The path planning may be executed by, for example, computation such as simulation in order to navigate the host vehicle 2 based on the detection information. The planning block 120 may further plan, for the host vehicle 2 following the planned path, an appropriate trajectory based on the acquired detection information prior to generating the control command. The trajectory planned by the planning block 120 may define at least one of, for example, a traveling position, a speed, an acceleration and a yaw rate in time series, as the kinematic properties of the host vehicle 2. The time series trajectory planning constructs a scenario of the future traveling by the navigation on the host vehicle 2. The planning block 120 may generate a trajectory by planning using the safety model. In this case, the safety model may be trained by a machine learning algorithm based on a calculation result obtained by calculating a cost function for giving a cost to the generated trajectory.

The planning block 120 may plan adjustment of a level of driving automation in the host vehicle 2 according to the acquired detection information. The adjustment of the level of driving automation may include takeover between the autonomous driving and manual driving. The takeover between the autonomous driving and the manual driving may be achieved in a scenario in association with entry or exit of an operational design domain (hereinafter referred to as an ODD) in which the autonomous driving is executed by setting the operational design domain. In a scenario of exit from the operational design domain, that is, a scenario of takeover from the autonomous driving to the manual driving, an unreasonable situation in which it is determined that an unreasonable risk is present based on, for example, the safety model is exemplified as a use case. In the use case, the planning block 120 may plan a DDT fallback for causing a driver who will be a fallback ready user to give the host vehicle 2 a minimal risk manoeuvre and transition the host vehicle 2 to a minimal risk condition.

The adjustment of the level of driving automation may include degradation traveling of the host vehicle 2. In a scenario of degradation traveling, if an unreasonable risk is present due to takeover to a manual driving mode, an unreasonable situation determined based on, for example, the safety model is exemplified as a use case. In the use case, the planning block 120 may plan a DDT fallback for transitioning the host vehicle 2 to the minimal risk condition by autonomous traveling and autonomous stopping. The DDT fallback for transitioning the host vehicle 2 to the minimal risk condition is not only achieved in adjustment of lowering the level of driving automation, but also achieved in adjustment of maintaining the level of driving automation and causing the host vehicle 2 to perform the degradation traveling, for example, in a minimum risk maneuver (MRM).

The risk monitoring block 140 acquires the detection information from the detection block 100. The risk monitoring block 140 monitors a risk between the host vehicle 2 and other target moving object 3 (see FIG. 7) for each scene based on the acquired detection information. The risk monitoring block 140 executes the risk monitoring of the target moving object 3 in time series based on the detection information so as to guarantee the SOTIF of the host vehicle 2. The target moving object 3 assumed in the risk monitoring is other road users present in the traveling environment of the host vehicle 2. The target moving object 3 includes a non vulnerable road user such as an automobile, a truck, a motorcycle, or a bicycle, and a vulnerable road user such as a pedestrian. The target moving object 3 may further include an animal.

The risk monitoring block 140 sets, based on the acquired detection information for each scene, a safety envelope based on, for example, the vehicle level safety strategy, which guarantees the SOTIF in the host vehicle 2. The risk monitoring block 140 may set a safety envelope between the host vehicle 2 and the target moving object 3 by using the safety model following the above driving policy. The safety model used for setting the safety envelope may be designed so as to avoid an unreasonable risk or potential accident responsibility caused by a misuse of the road user in accordance with an accident responsibility rule. In other words, the safety model may be designed such that the host vehicle 2 observes the accident responsibility rule following the driving policy. As such a safety model, for example, a responsibility sensitive safety model disclosed in Patent Literature 1 is exemplified.

In the setting of the safety envelope, based on the safety model assumed to follow the driving policy for the host vehicle 2 and the target moving object 3, a safety distance may be assumed based on a profile related to at least one motion physical quantity. The safety distance defines a boundary where a physics based margin is secured around the host vehicle 2 with respect to predicted motion of the target moving object 3. The safety distance may be assumed in consideration of a response time until an appropriate response is executed by the road user. The safety distance may be assumed to observe the accident responsibility rule. In a scene in which a lane structure such as a lane is present, a safety distance for avoiding risks of a rear-end crash and a head-on crash in a longitudinal direction of the host vehicle 2 and a safety distance for avoiding a risk of a side crash in a lateral direction of the host vehicle 2 may be calculated. On the other hand, in a scene in which the lane structure is not present, a safety distance for avoiding a risk of a trajectory crash in any direction of the host vehicle 2 may be calculated.

The risk monitoring block 140 may specify a situation for each scene of relative motion between the host vehicle 2 and the target moving object 3 prior to setting of the above safety envelope. In the scene in which the lane structure such as the lane is present, a situation in which the risks of the rear-end crash and the head-on crash in the longitudinal direction are assumed and a situation in which the risk of the side crash in the lateral direction is assumed may be specified. In the situation specifying in the longitudinal direction and the lateral direction, state amounts related to the host vehicle 2 and the target moving object 3 may be converted into a coordinate system assuming straight lanes. On the other hand, in the scene in which the lane structure is not present, a situation in which the risk of the trajectory crash in any direction of the host vehicle 2 is assumed may be specified. In the situation specifying function described above, at least a part of the state specifying function may be executed by the detection block 100, so that a situation specifying result may be given to the risk monitoring block 140 as the detection information.

The risk monitoring block 140 executes safety determination between the host vehicle 2 and the target moving object 3 based on the set safety envelope and the acquired detection information for each scene. That is, the risk monitoring block 140 achieves the safety determination by testing whether there is a violation of the safety envelope in a traveling scene interpreted based on the detection information between the host vehicle 2 and the target moving object 3. When the safety distance is assumed in the setting of the safety envelope, it may be determined that there is no violation of the safety envelope since an actual distance between the host vehicle 2 and the target moving object 3 exceeds the safety distance. On the other hand, if the actual distance between the host vehicle 2 and the target moving object 3 is equal to or less than the safety distance, it may be determined that there is a violation of the safety envelope.

When it is determined that there is a violation of the safety envelope, the risk monitoring block 140 may calculate a reasonable scenario for giving an appropriate action to be taken as the appropriate response to the host vehicle 2 by simulation. In the simulation of the reasonable scenario, state transition between the host vehicle 2 and the target moving object 3 is estimated, so that an action to be taken for each transition state may be set as a constraint on the host vehicle 2. In the setting of the action, a limit value assumed for at least one kinematic properties given to the host vehicle 2 may be calculated so as to limit the kinematic properties as a constraint on the host vehicle 2.

The risk monitoring block 140 may directly calculate a limit value for observing the accident responsibility rule based on the profile related to at least one motion physical quantity, based on the safety model assumed to follow the driving policy for the host vehicle 2 and the target moving object 3. It can be said that the direct calculation of the limit value itself is the setting of the safety envelope and is also setting of a constraint on the driving control. Therefore, when an actual value that is safer than the limit value is detected, it may be determined that there is no violation of the safety envelope. On the other hand, when an actual value beyond the limit value is detected, it may be determined that there is a violation of the safety envelope.

For example, the risk monitoring block 140 may store, in the memory 10, at least one type of evidence information among, for example, the detection information used for setting the safety envelope, determination information indicating a determination result of the safety envelope, detection information having influence on the determination result, and a simulated scenario. The memory 10 in which the evidence information is stored may be mounted in the host vehicle 2 according to the type of the dedicated computer constituting the processing system 1, or may be installed in an external center or the like outside the host vehicle 2. The evidence information may be stored in an unencrypted state, or may be stored in an encrypted or hashed manner. The storage of the evidence information is executed at least when it is determined that there is a violation of the safety envelope. Of course, the storage of the evidence information may also be executed when it is determined that there is no violation of the safety envelope.

The evidence information when it is determined that there is no violation of the safety envelope can be used as a lagging measure at a storage time point, and can also be used as a leading measure in the future.

The control block 160 acquires the control command from the planning block 120. The control block 160 acquires the determination information related to the safety envelope from the risk monitoring block 140. When the control block 160 acquires determination information indicating that there is no violation of the safety envelope, the control block 160 executes the planned driving control of the host vehicle 2 according to the control command.

On the other hand, when the control block 160 acquires determination information indicating that there is a violation of the safety envelope, the control block 160 gives a constraint following the driving policy based on the determination information to the planned driving control of the host vehicle 2. The constraint on the driving control may be a functional constraint. The constraint on the driving control may be a degraded constraint. The constraint on the driving control may be a constraint different from the above constraints. The constraint on the driving control is given by limitation of the control command. When the reasonable scenario is simulated by the risk monitoring block 140, the control block 160 may limit the control command according to the scenario. At this time, when the limit value is set for the kinematic properties of the host vehicle 2, the control parameter for the motion actuator included in the control command may be corrected based on the limit value.

Hereinafter, details of the first embodiment will be described.

Figure 9:
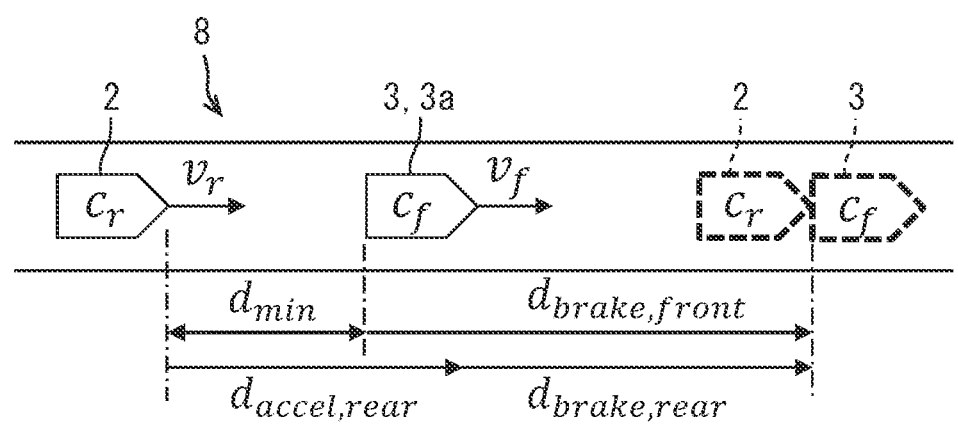
FIG. 9 is a diagram in which the host vehicle is traveling as a following vehicle of a target vehicle.

As illustrated in FIG. 9, the first embodiment can be applied when the host vehicle 2 travels on a lane structure 8 with separated lanes. As described later, the first embodiment can also be applied when the host vehicle 2 travels on a road having no lane structure 8. The lane structure 8 restricts the motion of the host vehicle 2 and the target moving object 3 with a direction in which the lane extends as the longitudinal direction. The lane structure 8 restricts the motion of the host vehicle 2 and the target moving object 3 with a width direction or an alignment direction of the lanes as the lateral direction.

A driving policy between the host vehicle 2 and the target moving object 3 in the lane structure 8 is defined by, for example, the following (A) to (E) when the target moving object 3 is a target vehicle 3a. A front of the host vehicle 2 means, for example, a traveling direction of a turning circle at a current steering angle of the host vehicle 2, a traveling direction of a straight line passing through a center of gravity of the vehicle orthogonal to an axle of the host vehicle 2, or a traveling direction of the sensor system 5 of the host vehicle 2 on an axis line of focus of expansion (FOE) of the same camera from a front camera module.

(A) Do not hit a vehicle traveling in front from behind (Do not hit someone from behind).

(B) Do not cut in recklessly between other vehicles (Do not cut-in recklessly).

(C) Yield to another vehicle even when own vehicle has a priority (Right-of-way is given, not taken).

(D) Be cautious in areas with limited visibility.

(E) If the host vehicle can avoid a crash without causing another one, take a reasonable action for that purpose (If you can avoid an accident without causing another one, you must do it).

The safety model obtained by modeling the SOTIF, which is a model following the driving policy, assumes that an action of a road user that does not lead to an unreasonable situation is an appropriate reasonable action to be taken. An unreasonable situation between the host vehicle 2 and the target moving object 3 in the lane structure 8 is a head-on crash, a rear-end crash, or a side crash. A reasonable action for the head-on crash includes, for example, braking by a reversely running vehicle, when the target moving object 3 with respect to the host vehicle 2 is the target vehicle 3a. A reasonable action for the rear-end crash includes, for example, avoidance of a sudden braking of a certain degree or more by a vehicle traveling in front and avoidance of a rear-end crash by a vehicle traveling behind on the premise of the above, when the target moving object 3 with respect to the host vehicle 2 is the target vehicle 3a. A reasonable action for the side crash includes, for example, a steering of vehicles traveling side by side in a direction separating from each other, when the target moving object 3 with respect to the host vehicle 2 is the target vehicle 3a. When assuming the reasonable actions, the state amounts related to the host vehicle 2 and the target moving object 3 are converted into an orthogonal coordinate system that defines the longitudinal direction and the lateral direction assuming a linear and planar lane structure 8 regardless of whether the lane structure 8 has curved lanes or high and low lanes.

It is preferable that the safety model is designed in accordance with an accident responsibility rule in which a moving object that does not take a reasonable action is responsible for an accident. In the safety model used to monitor a risk between the host vehicle 2 and the target moving object 3 under the accident responsibility rule in the lane structure 8, the safety envelope for the host vehicle 2 is set for the host vehicle 2 so as to avoid potential accident responsibility by a reasonable action. Therefore, the risk monitoring block 140 in a normal situation of the entire processing system 1 determines whether there is a violation of the safety envelope by checking the safety distance based on the safety model for each traveling scene with respect to the actual distance between the host vehicle 2 and the target moving object 3. When there is a violation of the safety envelope, the risk monitoring block 140 in the normal situation simulates a scenario for giving a reasonable action to the host vehicle 2. By the simulation, the risk monitoring block 140 sets a limit value related to at least one of, for example, a speed and an acceleration as the constraint on the driving control by the control block 160. In the following description, the violation determining function and the constraint setting function in the normal situation are referred to as normal safety functions.

In FIG. 9, the host vehicle 2 is a following vehicle with respect to the target vehicle 3a. The target vehicle 3a is an example of the target moving object 3. The target moving object 3 is a moving object that performs safety determination between the target moving object 3 and the host vehicle 2. The target moving object 3 may be a moving object that has no other moving object between it and the host vehicle 2. Even if another moving object is present between the target moving object 3 and the host vehicle 2, the moving object may also be used as the target moving object 3 as long as a safety distance $d_{min}$ can be calculated.

Figure 10:
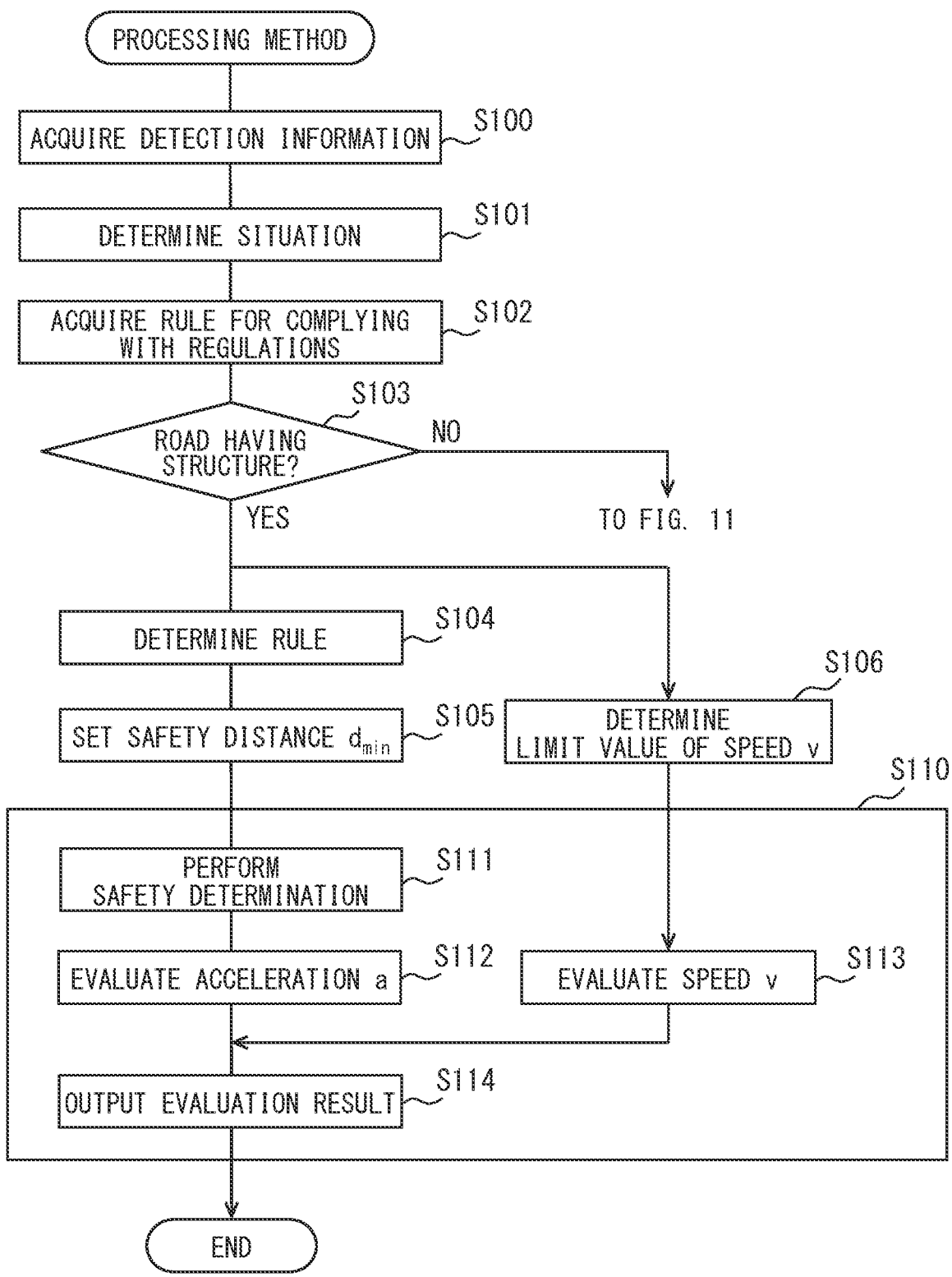
FIG. 10 is a flowchart illustrating a processing method executed by a risk monitoring block.

FIG. 10 illustrates a processing method executed by the risk monitoring block 140. The processing method is repeatedly executed at a fixed cycle. In S100 of the processing method, the risk monitoring block 140 acquires the detection information from the detection block 100.

In S101 of the processing method, a situation is determined based on the detection information acquired in S100. The situation is determined for each target moving object 3. A reason for determining the situation is to select a method of the safety determination (also referred to as safety envelope violation determination). The situation is a situation to be monitored or a situation to be determined. The situation may be a scenario or a scene. The processing in S101 may be processing of selecting a reasonably foreseeable scenario from scenarios defined in advance.

The situation may be determined separately for the longitudinal direction and the lateral direction. The situation in the longitudinal direction may include a situation in which a rear-end crash is determined and a situation in which a head-on crash is determined. Examples of the situation in which a rear-end crash is determined may include a situation in which the host vehicle 2 is a preceding vehicle and the target vehicle 3a is a following vehicle, and a situation in which the target vehicle 3a is a preceding vehicle and the host vehicle 2 is a following vehicle. The situation in which a head-on crash is determined may include a situation in which both the host vehicle 2 and the target vehicle 3a are traveling in a correct lane, a situation in which only one of the host vehicle 2 and the target vehicle 3a is traveling in a correct lane, a situation in which both the host vehicle 2 and the target vehicle 3a are traveling in a wrong lane, and a situation in which lane information is unknown. The situation in which the vehicles are traveling in a correct lane may be a situation in which the vehicle is traveling in a lane along a normal traveling direction defined by a regulation, a traffic sign, and a road marking. Examples of the situation in which both the host vehicle 2 and the target vehicle 3a are traveling in a correct lane include a situation in which the host vehicle 2 and the target vehicle 3a are traveling on a road having no center line. Examples of the situation in which only one of the vehicles is traveling in a correct lane include a situation in which one of the vehicles (the vehicle may be an emergency vehicle) runs out to an oncoming lane in order to overtake other vehicle (the vehicle may be parked on a one-lane road) on the road, and a situation in which the one of the vehicles is reversely running on a one-way road. Examples of the situation in which both the vehicles are traveling in a wrong lane include a situation in which both are traveling in a traveling prohibited area. Examples of the situation in which a lane situation is unknown include a situation in which a road on which the vehicle is traveling is a road not published on a map. The situation in the lateral direction may include a situation in which a side crash is determined. The situation in which a side crash is determined may include a situation in which the host vehicle 2 is on right and the target vehicle 3a is on left, and a situation in which the host vehicle 2 is on the left and the target vehicle 3a is on the right.

In S102 of the processing method, a rule for making the traveling of the host vehicle 2 complying with a regulation established for the road traveling is acquired. The rule for complying with the regulation may be the regulation itself established for the road traveling. The regulation established for the road traveling may be a traffic regulation such as the so-called Road Traffic Act. Examples of the rule for complying with the regulation include a rule of traveling at a speed equal to or lower than a speed limit set for a road on which the host vehicle 2 is traveling. Examples of the rule for complying with the regulation include a rule that stop at a stop line when the traffic light is red, and temporarily stop if there is the stop line. Examples of the rule for complying with the regulation include a rule that a vehicle other than a bus shall not travel in a bus lane, and a rule that in a bus priority lane, a vehicle other than a bus shall quickly move to other lane as soon as the bus approaches. Examples of the rule for complying with the regulation include a rule that when an emergency vehicle approaches, temporarily stop on a left or right side of a road. The rule for complying with the regulation can be acquired from one or more of the sensor system 5, the communication system 6, and the map DB 7 via the detection block 100 or can be directly acquired. A rule that does not depend on the road on which the host vehicle 2 is traveling among the rules for complying with the regulation may be acquired in advance.

In S103 of the processing method, whether the host vehicle 2 is traveling on a road having the lane structure 8 is determined. If the road on which the host vehicle 2 is traveling is a road having one or more lanes regardless of presence or absence of the lane marking, a determination result in S103 is YES. When the determination result in S103 is YES, the processing proceeds to S104.

In S104 of the processing method, a rule for setting the safety distance $d_{min}$ is determined. The rule that can be determined in S104 includes a standard rule and a switching rule. The switching rule is a restriction rule applied when an application condition for the switching rule is satisfied. The standard rule is a rule applied when the switching rule is not applied. The switching rule is a rule in which the standard rule is corrected assuming that the target moving object 3 observes the rule for complying with the regulation described in S102.

The switching rule may include one or more rules for complying with the regulation acquired in S102. The switching rule may include all the rules for complying with the regulation acquired in S102. The entire processing in S101 to S104, that is, the processing including determining the rule may correspond to the processing of selecting the reasonably foreseeable scenario from the multiple scenarios defined in advance, or may represent an example of processing of selecting a scenario. Processing including the entire processing in S101 to S104 and a part of processing in S105 described later, that is, processing including determining the rule may correspond to the processing of selecting the reasonably foreseeable scenario and processing of defining an assumption set for each scenario, or may represent examples of the processing of selecting a scenario and the processing of defining the assumption set.

In S105 of the processing method, the safety distance $d_{min}$ is set. The safety distance $d_{min}$ is set for each target moving object 3. The safety distance $d_{min}$ may be set by a calculation formula that varies depending on the situation determined in S101. The calculation formula for calculating the safety distance $d_{min}$ is set in advance. The calculation formula for calculating the safety distance $d_{min}$ may be calculated using a speed v and an acceleration a of each of the host vehicle 2 and the target vehicle 3a. The safety distance can be rephrased as an appropriate distance to be maintained for the other road user. The setting of the safety distance $d_{min}$ may be substantially setting of the safety envelope including defining a physics based boundary, margin, or buffer area around the host vehicle. Alternatively, the boundary, the margin, or the buffer area included in the setting of the safety envelope may be defined based on the setting of the safety distance $d_{min}$. The safety envelope may be set based on the assumption set defined for each scenario. The assumption set may be a minimum set of assumptions or a set including a part of the minimum set.

(Safety Distance $d_{min}$ when Standard Rule is Applied)

FIG. 9 also illustrates the safety distance $d_{min}$ in the situation in which a rear-end crash is determined. A relationship illustrated in Formula 1 is established for the safety distance $d_{min}$ in the situation in which a rear-end crash is determined, a stop distance $d_{brake, front}$ of a vehicle $c_f$ that is a preceding vehicle, a free running distance $d_{reaction, rear}$ of a vehicle $c_r$ that is a following vehicle, and a braking distance $d_{brake, rear}$ of the vehicle $c_r$.

$$d_{min}=d_{reaction, rear}+d_{brake, rear}-d_{brake, front} \quad \text{(Formula 1)}$$

The safety distance $d_{min}$ in the situation in which a rear-end crash is determined may be a distance at which the rear-end crash does not occur even when the vehicle $c_r$, which is a following vehicle, accelerates at a maximum acceleration $a_{max, accel}$ during a response time ρ seconds and then stops by braking at a minimum deceleration $a_{min, brake}$ when the vehicle $c_r$, which is a preceding vehicle, travels at a speed $v_f$ and stops at a maximum deceleration $a_{max, brake}$. The maximum deceleration $a_{max, brake}$, the maximum acceleration $a_{max, accel}$, and the minimum deceleration $a_{min, brake}$ of the respective vehicles may be the same or different.

The maximum acceleration $a_{max, accel}$ may be different from the acceleration a when the vehicle exhibits maximum acceleration ability. For example, the maximum acceleration $a_{max, accel}$ may be a value set from a viewpoint of continuing safe traveling. For example, the maximum acceleration $a_{max, accel}$ may be a reasonably foreseeable maximum assumed acceleration that the target moving object 3 (other road users) can exhibit. The maximum deceleration $a_{max, brake}$ may be different from a deceleration when the vehicle exhibits maximum deceleration ability. For example, the minimum deceleration $a_{min, brake}$ may be a value set from the viewpoint of continuing safe traveling. For example, the minimum deceleration $a_{min, brake}$ may be a reasonably foreseeable minimum assumed deceleration that the target moving object 3 (other road users) can exhibit. The response time ρ is a time from a start of the deceleration of the preceding vehicle to a start of the deceleration of the following vehicle. For example, the response time ρ may be set in advance. The deceleration is a positive value. For example, the response time ρ may be a reasonably foreseeable maximum assumed response time that the target moving object 3 (other road users) can exhibit. The deceleration indicates deceleration with a minus sign.

Figure 12:
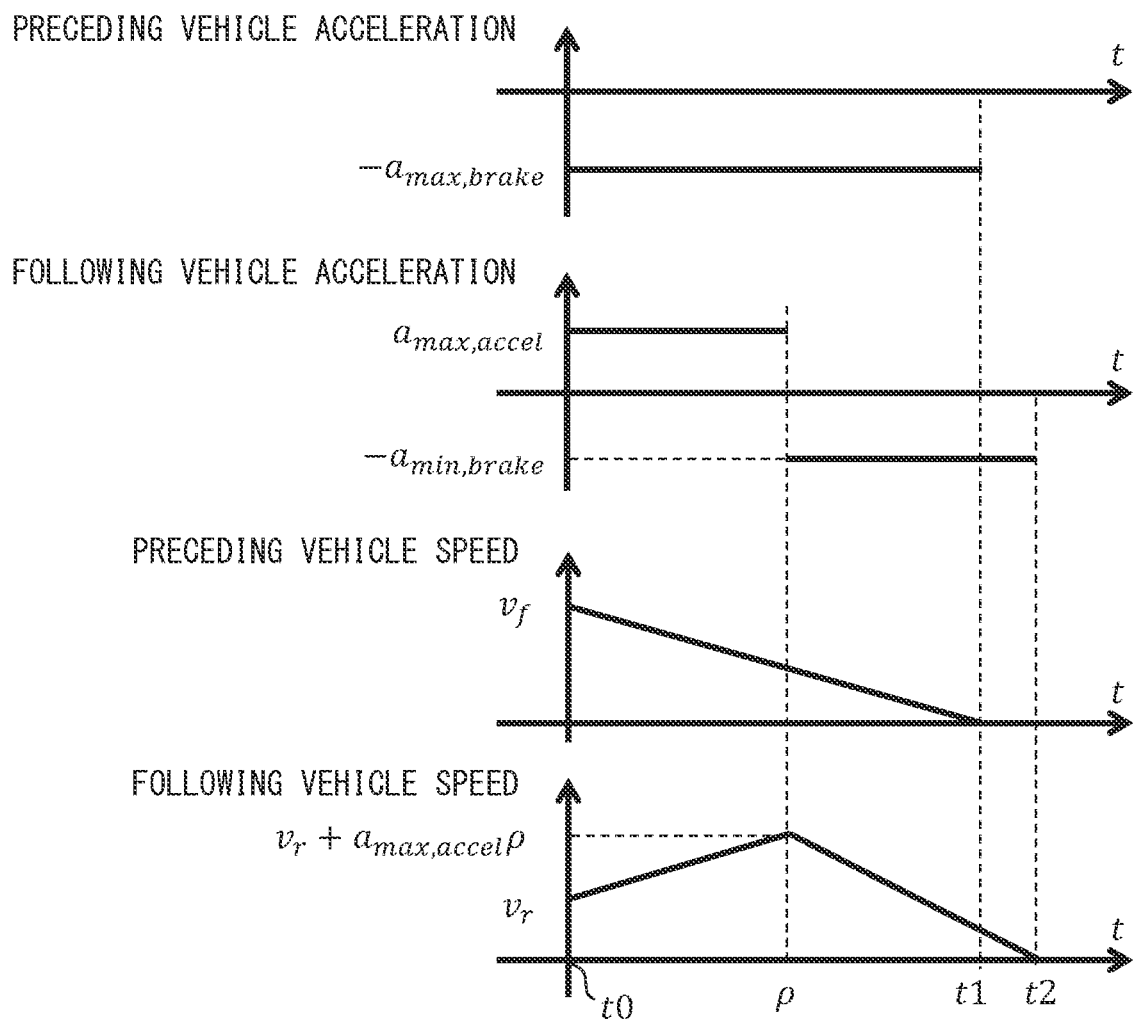
FIG. 12 is a diagram illustrating a temporal change in a speed and an acceleration of a preceding vehicle and a following vehicle.

FIG. 12 illustrates a temporal change in the speed v and the acceleration a of the preceding vehicle and the following vehicle from the start of the deceleration of the preceding vehicle. The temporal change in the speed v and the acceleration a of the preceding vehicle and the following vehicle from the start of the deceleration of the preceding vehicle is also referred to as an acceleration and deceleration profile.

The acceleration of the preceding vehicle is constant at $-a_{max, brake}$ from time t0 to time t1. The acceleration of the following vehicle is $a_{max, accel}$ from time t0 until the response time ρ elapses, and is $-a_{max, brake}$ from the response time ρ elapses to time t2. Therefore, the temporal change in the speed of the preceding vehicle is illustrated in a third graph, and the temporal change in the speed of the following vehicle is illustrated in a fourth graph.

Figure 13:
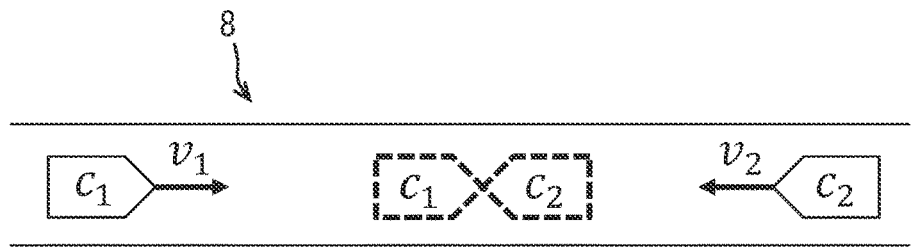
FIG. 13 is a diagram in which two vehicles are traveling facing each other.

In the situation in which a head-on crash is determined, as illustrated in FIG. 13, even when a vehicle $c_1$ and a vehicle $c_2$ travel facing each other at speeds $v_1$ and $v_2$, accelerate at the maximum acceleration $a_{max, accel}$ during the response time ρ seconds, and then stop by braking at the minimum deceleration $a_{min, brake}$, a distance at which the head-on crash does not occur may be set as the safety distance $d_{min}$. For a vehicle traveling in a correct lane, the minimum deceleration may be $a_{min, brake, correct}$ smaller than $a_{min, brake}$. Meaning of the maximum acceleration $a_{max, accel}$ and the minimum deceleration $a_{min, brake}$ is the same as in the situation in which a rear-end crash is determined.

Figure 14:
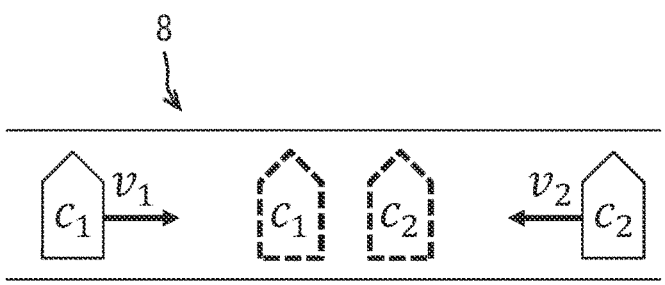
FIG. 14 is a diagram in which two vehicles are traveling adjacent to each other.

In the situation in which a side crash is determined, as illustrated in FIG. 14, even when the vehicles $c_1$ and $c_2$ travel adjacent to each other at lateral speeds $v_1$ and $v_2$, accelerate at a maximum acceleration $a_{max, \, accel, \, lat}$ during the response time ρ seconds, and then decelerate in the lateral direction at a minimum deceleration $a_{min, \, brake, \, lat}$, a distance at which a minimum distance μ is spaced and the crash does not occur may be set as the safety distance $d_{min}$. For example, the maximum acceleration $a_{max, \, accel, \, lat}$ may be a value set from the viewpoint of continuing safe traveling. For example, the maximum acceleration $a_{max, \, accel, \, lat}$ may be a reasonably foreseeable maximum assumed acceleration that the target moving object 3 (other road users) can exhibit. For example, the minimum deceleration $a_{min, \, brake, \, lat}$ may be a value set from the viewpoint of continuing safe traveling. For example, the minimum deceleration $a_{min, \, brake, \, lat}$ may be a reasonably foreseeable minimum assumed deceleration that the target moving object 3 (other road users) can exhibit. The minimum distance μ is a value set in advance.

(Safety Distance $d_{min}$ when Switching Rule is Applied)

A specific example of the safety distance $d_{min}$ when the switching rule is applied will be described. As an application example of the switching rule, the safety distance $d_{min}$ to the target vehicle 3a traveling outside a sensor detection range will be described. The switching rule corrects the standard rule in that a speed of the target vehicle 3a traveling outside the sensor detection range is set as a speed limit. The speed limit differs depending on the road. Therefore, in the switching rule, the speed limit is a changeable parameter.

Figure 15:
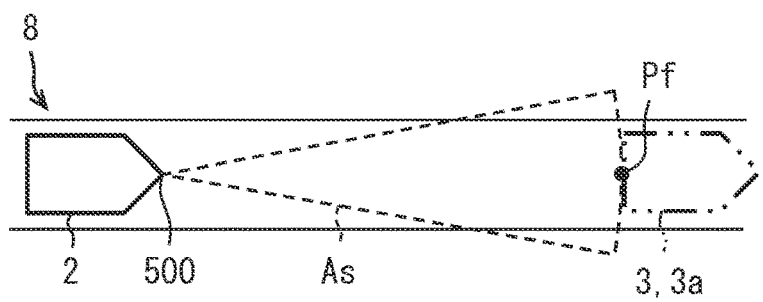
Figure 16:
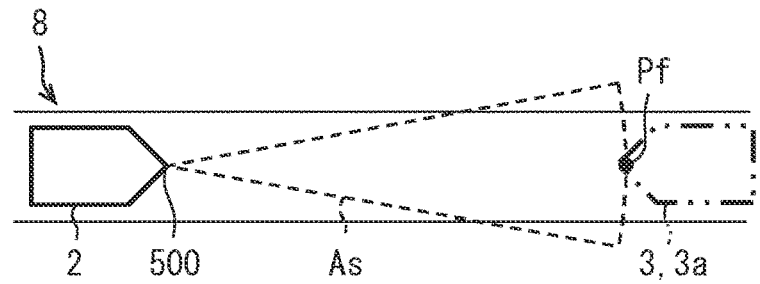

As illustrated in FIGS. 15 and 16, the external sensor 50 according to the first embodiment includes a single longitudinal direction sensor 500 in which a detection range As is set with respect to the longitudinal direction of the host vehicle 2. In the switching rule, the target vehicle 3a is assumed at a far point Pf in a detection limit distance in the detection range As. That is, a position of the virtual target vehicle 3a is assumed to be the far point Pf in the detection limit distance. The far point Pf is defined as a position in the detection limit distance that is a longest distance in the longitudinal direction or the lateral direction in the detection range As. In FIG. 15, the virtual target vehicle 3a is traveling in the same direction as the host vehicle 2. In FIG. 16, the virtual target vehicle 3a is traveling toward the host vehicle 2.

In an example of the standard rule, a condition that is a most severe condition for the host vehicle 2, in other words, a condition that minimizes an unreasonable risk is defined as the assumption set that is defined for each scenario. In the scenario in FIG. 15, it may be assumed that the standard rule is that the target vehicle 3a traveling outside the sensor detection range is stopped, that is, the speed is 0. In the scenario in FIG. 16, it may be assumed that the standard rule is that the target vehicle 3a traveling outside the sensor detection range is traveling at a speed exceeding an upper limit speed. On the other hand, in an example of the switching rule, a more relaxed condition than the condition of the standard rule is defined as the assumption set defined for each scenario. The more relaxed condition than the condition of the standard rule may be a condition based on a reasonable and foreseeable assumption. In the scenario in FIG. 15, when a lower limit speed of the road is defined by a regulation or a traffic sign, it may be assumed that the switching rule is that the target vehicle 3a traveling outside the sensor detection range is traveling at the lower limit speed. In the scenario in FIG. 16, when the upper limit speed of the road is defined by a regulation or a traffic sign, it may be assumed that the switching rule is that the target vehicle 3a traveling outside the sensor detection range is traveling at the upper limit speed. The safety distance $d_{min}$ between the host vehicle 2 and the target vehicle 3a is set assuming that the speed of the target vehicle 3a is the speed limit of the road on which the vehicles are traveling. The safety distance $d_{min}$ may be calculated by the same calculation as when the target vehicle 3a can be detected, except that the speed of the target vehicle 3a is assumed to be the speed limit of the road on which the vehicles are traveling. Except that the speed of the target vehicle 3a is assumed to be the speed limit of the road on which the vehicles are traveling, the maximum deceleration $a_{max, \, brake}$, the maximum acceleration $a_{max, \, accel}$, the minimum deceleration $a_{min, \, brake}$, a maximum response time $ρ_{min}$, and the like of the target vehicle 2a may be assumed as reasonably foreseeable parameters, and then the safety distance $d_{min}$ may be calculated.

When the lane structure 8 is present and the target vehicle 3a present in the detection range As can be detected, it is not necessary to assume the virtual target vehicle 3a at the far point Pf in the detection range As. Therefore, one application condition of the switching rule is that the target vehicle 3a cannot be detected in the same lane as the lane in which the host vehicle 2 is traveling in the sensor detection range (presence is not confirmed).

Other application example of the switching rule will be described. As the other application example of the switching rule, rushing out of the target vehicle 3a from a blind spot will be described. In other words, the rushing out of the target vehicle 3a from the blind spot is appearance of the target vehicle 3a from a shielded area. The switching rule sets the speed of the target vehicle 3a to the speed limit when assuming that the target vehicle 3a rushes out from the blind spot. It is assumed that the target vehicle 3a stops at a stop line when the traffic light is red, and temporarily stops if there is the stop line. In these points, the standard rule is corrected.

Figure 17:
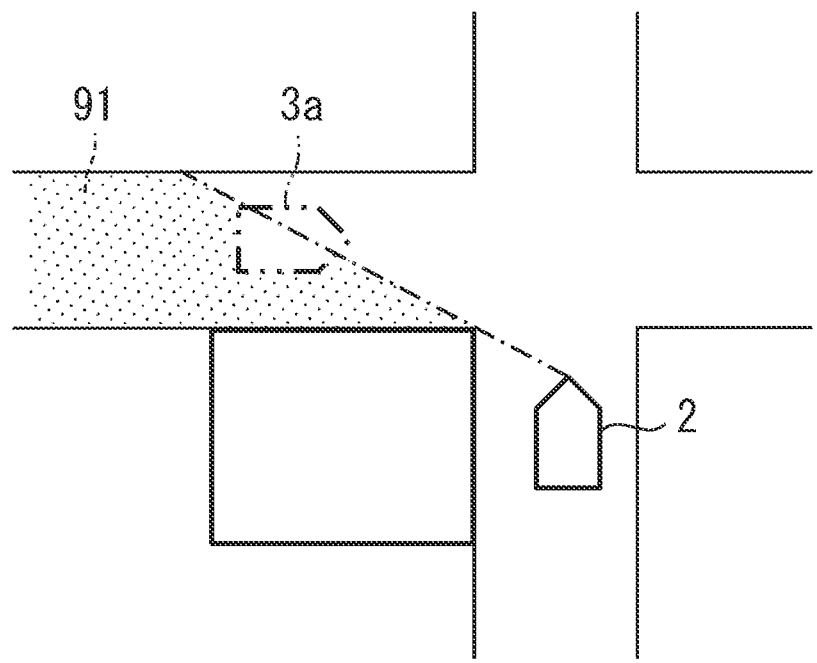
FIG. 17 is a diagram illustrating a virtual target vehicle assumed at an end of a blind spot area.

As illustrated in FIG. 17, if there is a blind spot area 91 as viewed from the host vehicle 2 when the paths cross, the virtual target vehicle 3a is set at an end of the blind spot area 91. If there is a traffic light at a crossing and the road on which the virtual target vehicle 3a is traveling is at a red signal, it is assumed that the virtual target vehicle 3a stops in front of the crossing. If there is a stop line in front of the crossing on the road on which the virtual target vehicle 3a is traveling, it is assumed that the virtual target vehicle 3a stops at the stop line. Even when there is no stop line, if the road on which the virtual target vehicle 3a is traveling is a non-priority road, it is assumed that the virtual target vehicle 3a travels at a speed that allows the virtual target vehicle 3a to stop in front of the crossing.

On the other hand, if the road on which the virtual target vehicle 3a is traveling has priority, it is assumed that the virtual target vehicle 3a passes through the crossing at the speed limit of the road on which the virtual target vehicle 3a is traveling. If the virtual target vehicle 3a enters the crossing later than the host vehicle 2 traveling on the non-priority road, the virtual target vehicle 3a may be assumed to travel at a speed at which the virtual target vehicle 3a does not rear-end crash with the host vehicle 2. In this case, if the virtual target vehicle 3a enters the crossing prior to the host vehicle 2, the virtual target vehicle 3a is assumed to pass through the crossing at the speed limit. The safety distance $d_{min}$ between the host vehicle 2 and the target vehicle 3a is set based on the assumed speed.

When there is no blind spot area 91 in the sensor detection range, it is not necessary to assume the virtual target vehicle 3a at the end of the blind spot area 91. Therefore, one application condition of the switching rule is that the blind spot area 91 is present within the detection range.

The description will be returned to FIG. 10. In S110 of the processing method, the violation of the safety envelope is monitored. S110 includes S111 to S114. In S111, the safety determination is performed. The safety determination is performed by comparing the safety distance $d_{min}$ set for each situation with a current distance between the host vehicle 2 and the target moving object 3. If the safety distance $d_{min}$ is shorter than the current distance, it is determined that the safety envelope is in a violation state. That is, if the current distance is longer than the safety distance $d_{min}$, it is determined that the safety envelope is not in a violation state. The safety determination is performed for each target moving object 3.

In S112 of the processing method, the acceleration a is evaluated. The evaluation is performed by comparing a limit value of the acceleration a with a current acceleration a of the host vehicle 2.

The limit value of the acceleration a can be determined based on a result of the safety determination. As the result of the safety determination, when the safety envelope is in a violation state, the acceleration a is not limited. When the determination result is unsafe, the acceleration a on the side of the longitudinal direction and the lateral direction on which the determination result is that the safety envelope is not in the violation state at is limited, and the braking is required. Since the safety determination is performed for each target moving object 3, for example, multiple limit values of the acceleration a may be set in the longitudinal direction and the lateral direction.

Further, when it is necessary to stop in front of an intersection based on a red signal and when there is a stop line and it is necessary to stop in front of the stop line, an acceleration and deceleration profile for stopping at a position where stop is required is calculated. In the calculated acceleration and deceleration profile, a position where stop is required in front of the intersection or in front of the stop line is set as the stop position instead of a position where the rear-end crash to the target vehicle 3a does not occur. Otherwise, when determining the rear-end crash, the acceleration and deceleration profile is calculated in the same manner as when calculating the safety distance $d_{min}$. Then, the acceleration a at each position determined from the calculated acceleration and deceleration profile is also set as the limit value of the acceleration a.

Stopping in front of the intersection at a red signal and stopping in front of the stop line means that traveling is in compliance with the regulation. The limit values of the acceleration a determined from the acceleration and deceleration profile when stopping in front of the intersection at the red signal and the acceleration and deceleration profile when stopping in front of the stop line are limit values of the acceleration a for safely stopping when stopping in order to comply with the regulation.

When the multiple limit values of the acceleration a are set, the multiple limit values are integrated and evaluated. In the integration, a most limited value among the multiple limit values is used as a limit value to be compared with the current acceleration a of the host vehicle 2.

S106 and S113 of the processing method are processing independent of S104 and S112. S106 and S113 may be executed in parallel with S104 to S112. S106 and S113 may be executed before or after S104 to S112.

In S106, a limit value of the speed v is determined. An example of the limit value of the speed v is the speed limit acquired in S102. Another example of the limit value of the speed v will be described. The other example of the limit value of the speed v is an example in which the virtual target vehicle 3a is set as illustrated in FIG. 17 described above. In this example, it is assumed that the host vehicle 2 is traveling on a priority road and the virtual target vehicle 3a is coming out from the blind spot area 91. At this time, when the host vehicle 2 enters the crossing prior to the virtual target vehicle 3a, a right-of-way of the crossing is defined by the host vehicle 2 among the host vehicle 2 and the virtual target vehicle 3a. A lower limit speed at which the rear-end crash to the virtual target vehicle 3a does not occur is set as the limit value. On the contrary, when the host vehicle 2 enters the crossing later than the virtual target vehicle 3a, the right-of-way of the crossing is defined by the target vehicle 3a among the host vehicle 2 and the virtual target vehicle 3a. An upper limit speed at which the rear-end crash to the virtual target vehicle 3a does not occur or an upper limit speed at which an appropriate distance from the target vehicle 3a can be maintained is set as the limit value. When the host vehicle 2 is traveling on the non-priority road, an upper limit speed at which the host vehicle 2 can stop in front of the crossing is set as the limit value.

In S113 of the processing method, the speed v is evaluated. The evaluation is performed by comparing the limit value of the speed v with a current speed v of the host vehicle 2. When multiple limit values of the speed v are set, the multiple limit values are integrated and evaluated. In the integration, a most limited value among the multiple limit values is used as a limit value to be compared with the current speed v of the host vehicle 2.

In S114 of the processing method, an evaluation result in S112 and an evaluation result in S113 are output. The evaluation results are given to the control block 160. The evaluation results may be included in the determination information and given to the control block 160. The determination information includes the result of the safety determination executed in S111. The evaluation information may include a constraint defined by the evaluation results. The constraint may include one or both of a constraint for the acceleration and a constraint for the speed.

Figure 11:
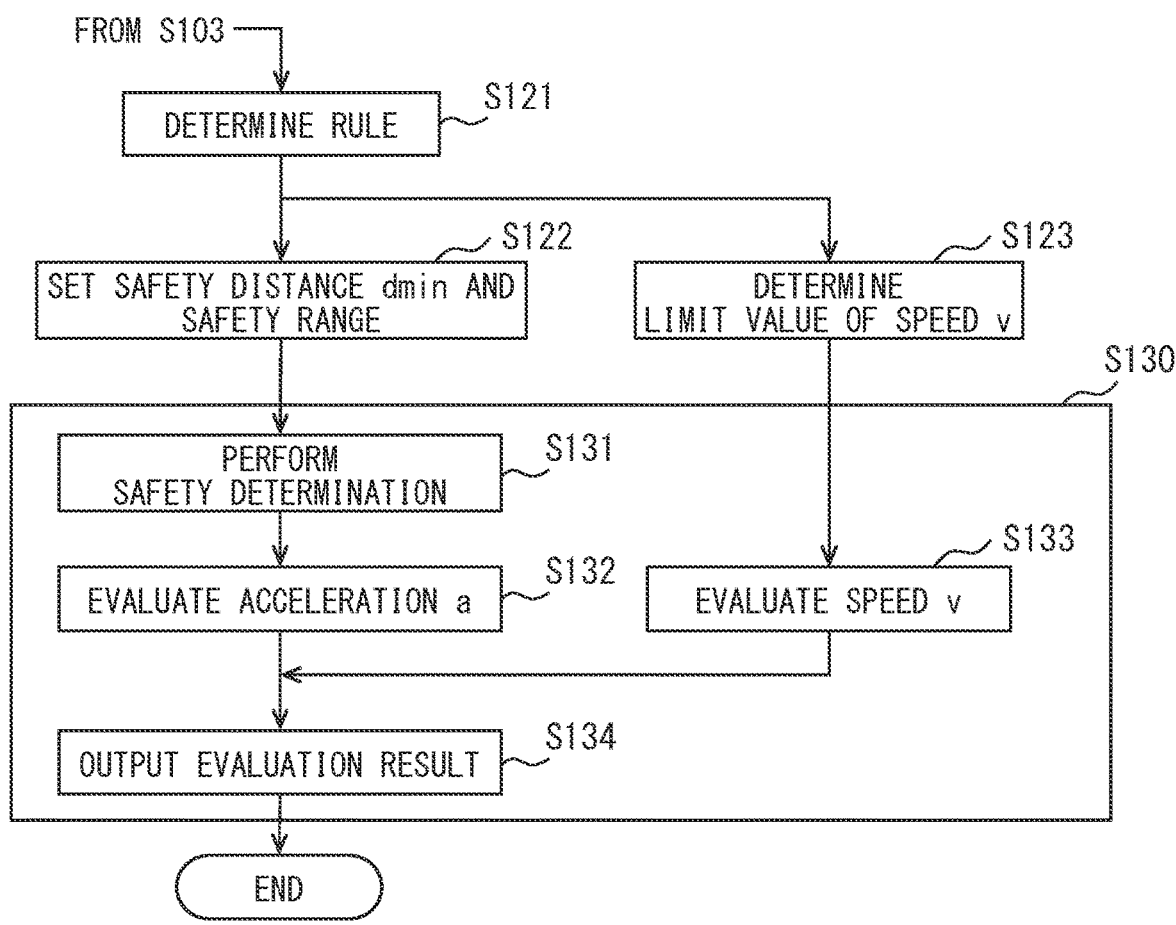
FIG. 11 is a flowchart illustrating a processing method executed by the risk monitoring block.

Next, FIG. 11 will be described. FIG. 11 is executed when the host vehicle 2 is traveling on a road having no structure. In S121 of the processing method, a rule for setting the safety distance $d_{min}$ is determined. The rule that can be determined in S121 includes a free space standard rule and a free space restriction rule. The free space restriction rule is a restricted rule applied when an application condition for the free space restriction rule is satisfied, that is, a restriction rule. The free space standard rule is applied when the switching rule is not applied.

The free space restriction rule is a rule applied when a vehicle operation set in advance is performed on the road having no structure. The application condition for the free space restriction rule can be a condition that the host vehicle 2 is located in an area in which the vehicle operation set in advance is performed. The application condition for the free space restriction rule can be that it can be detected that the host vehicle 2 is performing the vehicle operation set in advance. The application condition for the free space restriction rule can be an AND condition of the above two application conditions. When the target moving object 3 is the target vehicle 3a, the application condition for the free space restriction rule can be a condition that at least one of the host vehicle 2 and the target vehicle 3a is located in the area in which the vehicle operation set in advance is performed. The application condition for the free space restriction rule can be a condition that it can be detected that a vehicle located in the area in which the vehicle operation set in advance is performed among the host vehicle 2 and the target vehicle 3a is performing the vehicle operation set in advance.

(Standard Rule on Road Having No Structure)

When the application condition to which the free space restriction rule is applied is not satisfied, the free space standard rule is applied. A driving policy premised on the free space standard rule on the road having no structure is defined by, for example, the following (F) to (H) when the target moving object 3 is the target vehicle 3a.

(F) Vehicles perform braking with respect to each other.

(G) In a scene in which an unreasonable situation is avoided by the braking, the braking is absent.

(H) A vehicle is permitted to advance when another vehicle is not present in front. In the free space standard rule, a standard rule on a road having a structure, that is, some or all of rules based on (A) to (E) may not be applied.

A safety model following the driving policy defines trajectories of the host vehicle 2 and the target moving object 3 crashing with each other as an unreasonable situation. In other words, the safety model may be defined, for the host vehicle 2 and the target moving object 3, by the modeling of the SOTIF in which an unreasonable risk such as a trajectory crash is absent. The safety model may be a safety-related model itself, or may be a model constituting a part of the safety-related model. All or some of the standard rules and the restriction rules in the present embodiment may be defined based on attributes of the safety-related model used in the dynamic driving task. A situation in which the trajectory crash is absent is guaranteed by establishment of at least one of the following first and second conditions. In (G), a rule in which the unreasonable situation is replaced with a hazardous situation may be used.

Figure 18:
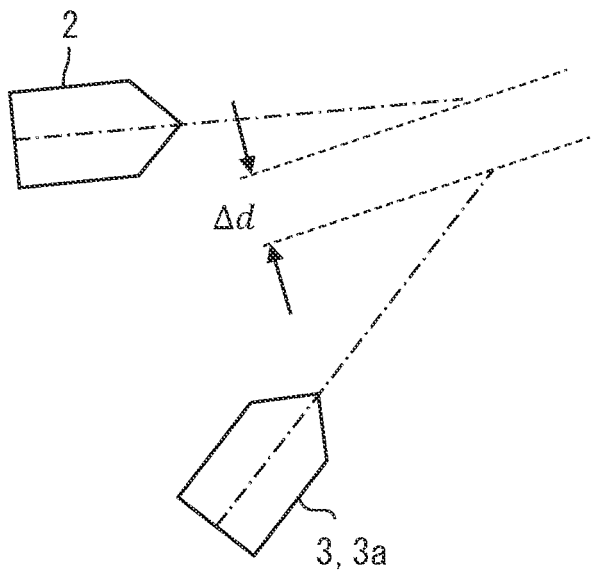
FIG. 18 is a diagram illustrating a first condition for guaranteeing an absence situation of a trajectory crash.

The first condition is that a minimum distance $\Delta d$ between the trajectories of the host vehicle 2 and the target moving object 3 illustrated in FIG. 18 is larger than a design value based on, for example, the accident responsibility rule. Due to the establishment of the first condition, each traveling distance until the host vehicle 2 and the target moving object 3 stop is always a constant value or more.

Figure 19:
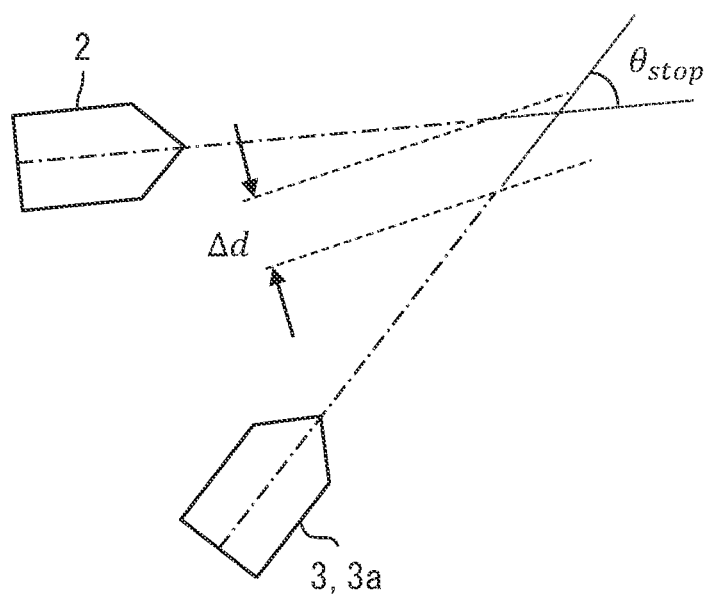
FIG. 19 is a diagram illustrating a second condition for guaranteeing the absence situation of the trajectory crash.

The second condition is that an angle $\theta_{stop}$ formed by a relative position vector when the host vehicle 2 is stopped and a traveling direction of the target moving object 3 illustrated in FIG. 19 is smaller than a design value based on, for example, the accident responsibility rule. Due to the establishment of the second condition, a distance until the host vehicle 2 stops on the trajectory is always a constant value or more, and the target moving object 3 is present in front of the stopped host vehicle 2.

Figure 20:
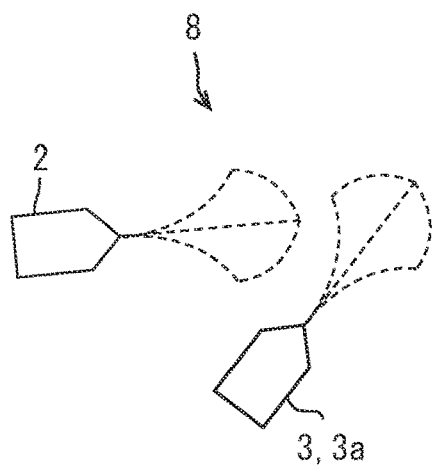
FIG. 20 is a diagram illustrating a first safety state on a road having no structure.
Figure 21:
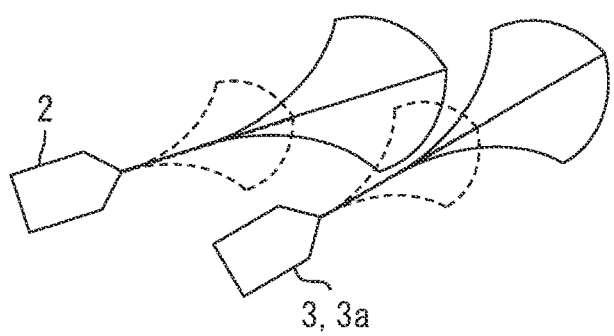
FIG. 21 is a diagram illustrating a second safety state on the road having no structure.
Figure 22:
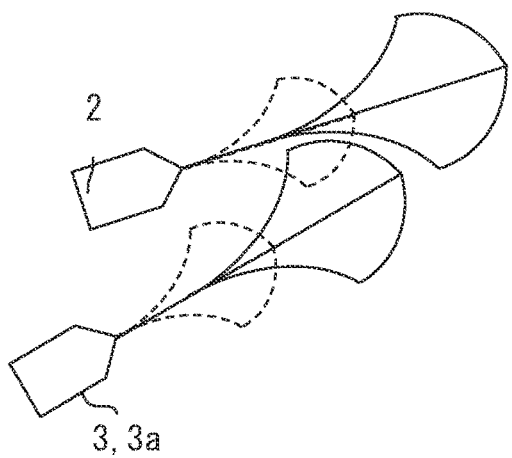
FIG. 22 is a diagram illustrating a third safety state on the road having no structure.

In FIGS. 20, 21, and 22, figures shown by dashed lines extending forward from the host vehicle 2 and the target vehicle 3a indicate arrival ranges until the host vehicle 2 and the target vehicle 3a are stopped by the braking control. It is assumed that the figure shown by the dashed lines deviates to a right or left side in the traveling direction of a trajectory at the time point when the arrival range is calculated after a predetermined time is elapsed since a time point when the arrival range is calculated. Therefore, in the figure indicating the arrival range, positions farthest from the host vehicle 2 and the target vehicle 3a have an arc shape. The arrival range shown by the dashed lines is an arrival range when the braking control is performed based on the acceleration and deceleration profile when a rear-end crash is determined on the road having a structure.

In FIGS. 21 and 22, figures shown by solid lines extending from the host vehicle 2 and the target vehicle 3a indicate arrival ranges at which the host vehicle 2 and the target vehicle 3a arrive without performing the braking control for stopping the host vehicle 2 and the target vehicle 3a. The arrival range shown by the solid lines indicates a range at which the host vehicle 2 and the target vehicle 3a arrive at the same time as the arrival range shown by the dashed lines.

Figure 23:
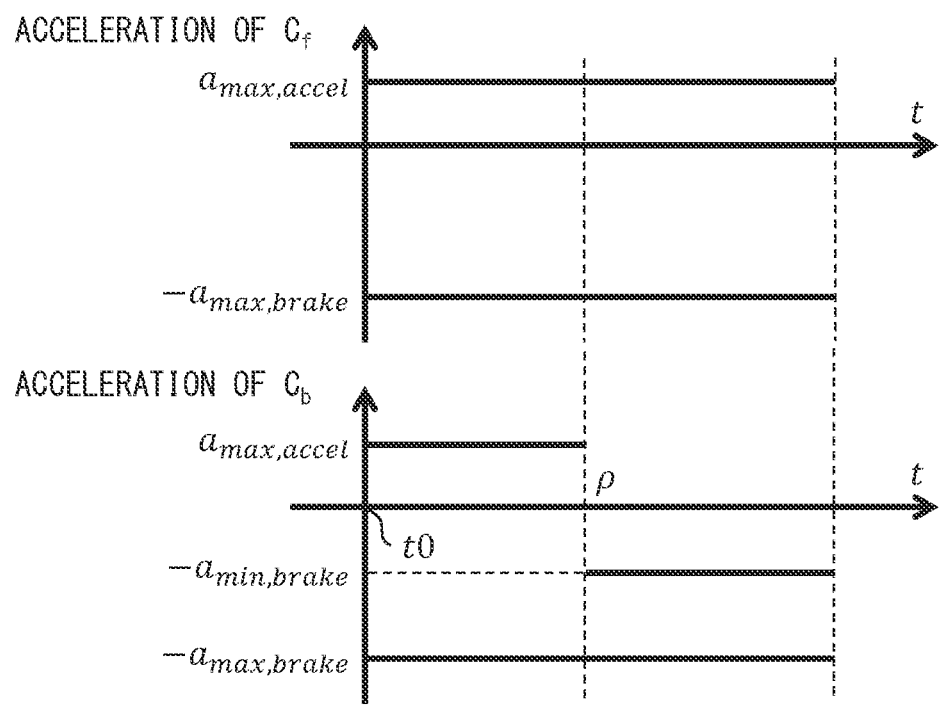
FIG. 23 is a diagram illustrating an acceleration and deceleration profile in a longitudinal direction on the road having no structure.

FIG. 23 illustrates an example of the acceleration and deceleration profile in the longitudinal direction on the road having no structure. In FIG. 23, meanings of $C_f$ and $C_b$ are the same as those in FIG. 9. The acceleration of $c_f$ indicates the upper and lower limit values of the acceleration when the vehicle advances without change. The advancing without change means that the braking control for stopping is not performed. Since the vehicle advances without change, the acceleration does not change. $a_{max,\ accel}$ is the upper limit value of the acceleration a set in the safety model, and $-a_{max,\ brake}$ is the lower limit value of the acceleration a set in the safety model. The acceleration a does not change when the vehicle advances without change. The upper and lower limit values of the acceleration a are values set in advance. The acceleration of $c_b$ indicates the upper and lower limit values of the acceleration when the vehicle stops by performing the braking control, and the braking control is started at time t0. P is the response time. $-a_{min,\ brake}$ is a minimum deceleration, in other words, a minimum value of the deceleration.

Figure 24:
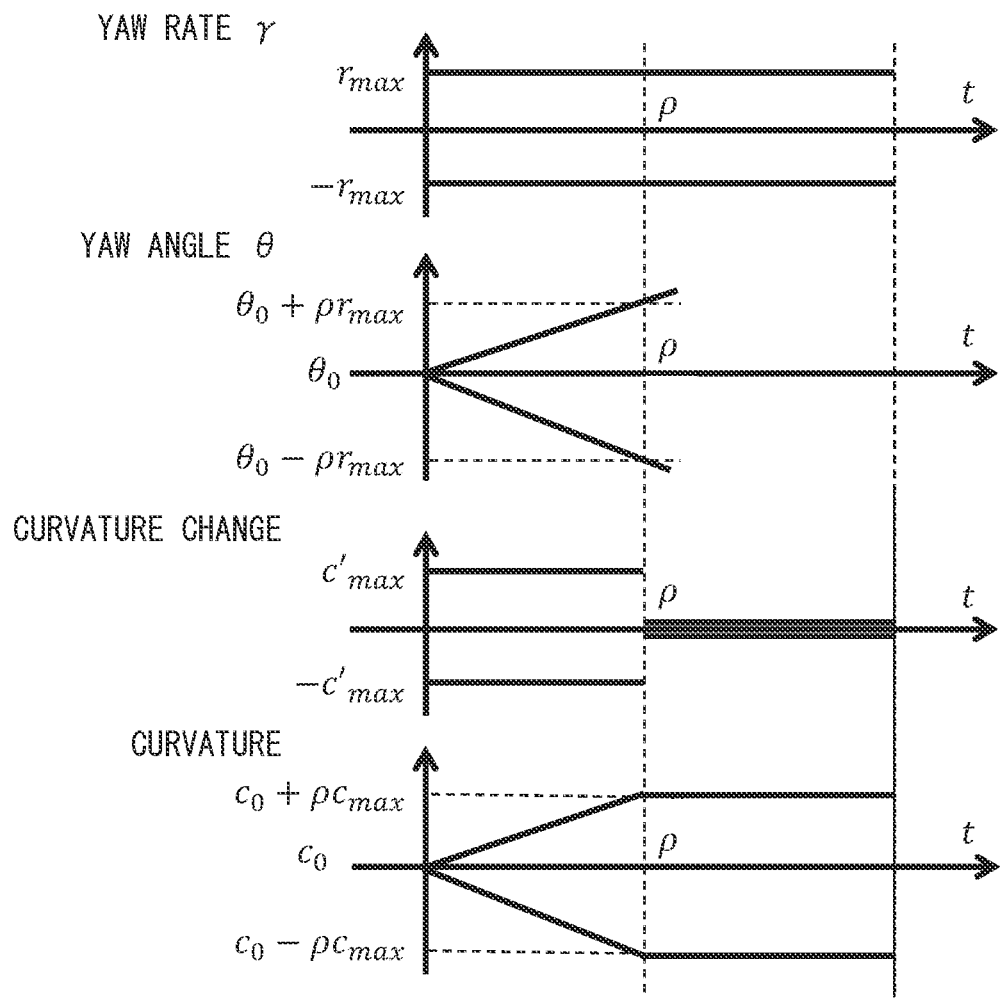
FIG. 24 is a diagram illustrating a speed profile in a lateral direction on the road having no structure.

FIG. 24 illustrates an example of a speed profile in the lateral direction on the road having no structure. The speed profile in the lateral direction is common to $c_f$ and $C_b$. $\gamma_{max}$ is a maximum yaw rate, and $-\gamma_{max}$ is a minimum yaw rate. $c'_{max}$ is a maximum value of a curvature change, and $c'_{max}$ is a minimum value of the curvature change. These values are set in advance in the safety model.

The arrival ranges illustrated in FIGS. 20, 21, and 22 are determined based on the acceleration profile in the longitudinal direction illustrated in FIG. 23 and the speed profile in the lateral direction illustrated in FIG. 24. A rule in which the arrival range determined in this manner is set as a safety range, and a rule that prevents a safety range of the host vehicle 2 and a safety range of the target moving object 3 from overlapping is a standard rule. A safety range shown by the dashed lines is set as a safety range in stop, and a safety range shown by the solid lines is set as a safety range in passing. The safety range in passing may be referred to as a non-stop safety range. A distance from the host vehicle 2 to each point in an arc of the safety range is the safety distance $d_{min}$.

Figure 25:
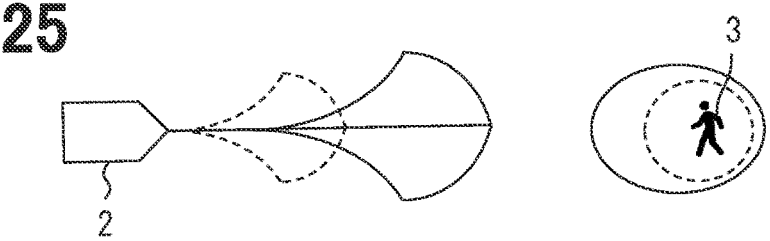
FIG. 25 is a diagram illustrating a safety range set when a target moving object 3 is a person.

FIG. 25 illustrates a safety range set when the target moving object 3 is a person. Even when the target moving object 3 is a person, the safety range in stop and the safety range in passing can be set. The safety range when the target moving object 3 is a person is set to a range including the person. When the target moving object 3 is a person, the safety range in passing includes the safety range in stop. Sizes of the two safety ranges may be fixed or may be increased according to a travel speed of the person. The safety range can be shaped to extend relatively far in a direction at which the person moves. The safety range in stop and the safety range in passing which are different from each other may be set according to actions predicted respectively for an adult and a child. The safety range in stop and the safety range in passing may be set according to actions predicted respectively for a bicycle, a motorcycle, a kickboard, a roller skate, a Segway (registered trademark), a wheelchair, a baby carriage, a carriage, and a streetcar.

The safety model on the road having no structure sets a safety envelope that does not lead to an unreasonable situation such as a trajectory crash. The safety envelope is set to establish one of the following first to third safety states.

As illustrated in FIG. 20, the first safety state is a state in which a crash between the trajectories does not occur in a reachable range of the host vehicle 2 and the target moving object 3 until both the host vehicle 2 and the target moving object 3 stop. As illustrated in FIG. 21, the second safety state is a state in which a crash between the trajectories does not occur in a reachable range of the host vehicle 2 and the host vehicle 3a even when the host vehicle 2 stops by performing the braking control and the target vehicle 3a passes without change and without performing the braking control. In the second safety state, when the target vehicle 3a stops by performing the braking control and the host vehicle 2 advances without change, the crash between the trajectories in the reachable range of the host vehicle 2 and the host vehicle 3a is avoided.

As illustrated in FIG. 22, the third safety state is a state in which the crash between the trajectories does not occur in the reachable range of the host vehicle 2 and the host vehicle 3a even when the target vehicle 3a stops by performing the braking control and the host vehicle 2 advances without change. In the third safety state, when the host vehicle 2 stops by performing the braking control and the target vehicle 3a advances without change, the crash between the trajectories in the reachable range of the host vehicle 2 and the target vehicle 3a is avoided.

The standard rule on the road having no structure assumes the following first to third actions as appropriate reasonable actions to be taken by the host vehicle 2 when an unreasonable situation occurs. In the first action, when both the host vehicle 2 and the target moving object 3 are completely stopped, if the target vehicle 3a is not located in front of the host vehicle 2, the host vehicle 2 moves forward and separates from the target vehicle 3a. On the other hand, in the first action, even when both the host vehicle 2 and the target moving object 3 are completely stopped, if the target vehicle 3a is located in front of the host vehicle 2, the host vehicle 2 continues to be completely stopped until the unreasonable situation is absent.

In the second action, when the host vehicle 2 falls into an unreasonable situation from the second or third safety state, the host vehicle 2 continues to advance as long as the target vehicle 3a is not stopped. In the second action, when the target vehicle 3a is stopped while the host vehicle 2 continues to advance, if the target vehicle 3a is not located in front, the host vehicle 2 continues to advance.

On the other hand, in the second action, when the target vehicle 3a is stopped while the host vehicle 2 continues to advance, if the target vehicle 3a is located in front, the host vehicle 2 performs a stop operation. In the third action, in a case other than the first action and the second action, the host vehicle 2 performs the stop operation. Whether the target vehicle 3a is located in front of the host vehicle 2 in the first and second actions is determined based on the above second condition.

(Free Space Restriction Rule)

The free space restriction rule changes the arrival range in the standard rule. As an example of the free space restriction rule, a rule applied to entering and exiting with respect to a parking space 92 (hereinafter referred to as an entering and exiting rule) will be described.

The entering and exiting rule is applied when the host vehicle 2 performs an entering and exiting operation. The entering and exiting rule may be applied when the host vehicle 2 is located in a vicinity of the parking space. The entering and exiting rule may be applied when the target moving object 3 is present in the vicinity of the parking space 92. Therefore, one application condition of the entering and exiting rule is a condition that the host vehicle 2 performs the entering and exiting operation. Another application condition is a condition that the host vehicle 2 is located in the vicinity of the parking space. Still another application condition is a condition that the target moving object 3 is located in the vicinity of the parking space 92. The parking space 92 is present on the road having no structure.

The entering and exiting rule is applied when a vehicle that performs the entering and exiting operation (hereinafter referred to as an entering and exiting vehicle) is present. The entering and exiting vehicle is the host vehicle 2 or the target vehicle 3a. When the entering and exiting rule is applied, a safety range for the entering and exiting vehicle is set as a fixed range. The safety range includes the safety range in stop and the safety range in passing. The two safety ranges are both set as fixed ranges. In this regard, the entering and exiting rule is a rule for correcting the free space standard rule. The size of the safety range in passing includes a moving range of the vehicle during the entering and exiting operation. The safety range in stop may also have a size including the moving range of the vehicle during the entering and exiting operation.

Figure 26:
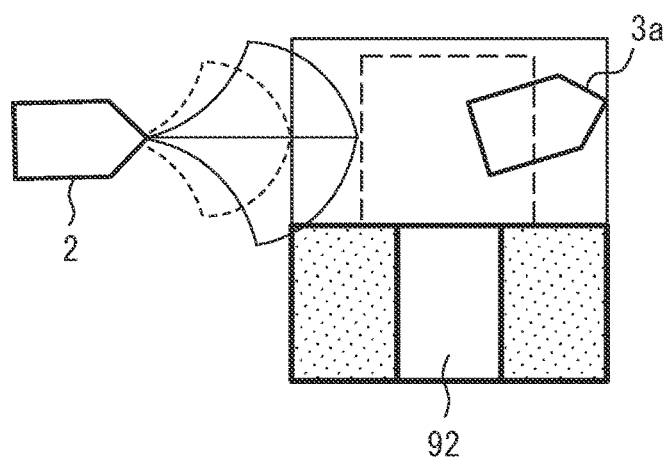
FIG. 26 is a diagram illustrating a safety range set according to an entering and exiting rule according to the first embodiment.

FIG. 26 illustrates the two safety ranges set as the fixed ranges by using the entering and exiting vehicle as the target vehicle 3a. The two safety ranges are determined with respect to the parking space 92. Both of the two safety ranges are rectangular. Both of the safety ranges are in contact with the parking space 92, and the safety range shown by the dashed lines is narrower than the safety range shown by the solid lines. The safety range shown by the solid lines includes the safety range shown by the dashed lines. The safety range set as the fixed range may have a shape other than rectangular. Since the safety range is a fixed range, the safety range for the target vehicle 3a does not change while the target vehicle 3a is performing a parking operation.

Returning the description to FIG. 11. After the rule is determined in S121 of the processing method, S122 is executed. In S122 of the processing method, the safety range is set. When the safety range is set, the safety distance $d_{min}$ is also set. When the free space standard rule is applied, the two safety ranges illustrated in FIGS. 21 and 22 are set based on the speed of the host vehicle 2. When the free space restriction rule is applied, the safety range for the entering and exiting vehicle is set as a fixed range. For a moving object which is not the entering and exiting vehicle among the host vehicle 2 and the target moving object 3, the safety range is set by the same manner as the free space standard rule.

In an example in FIG. 26, the host vehicle 2 sets the safety range by the same manner as the free space standard rule. In the processing method executed by the host vehicle 2, the safety range for the target vehicle 3a is set as a fixed range.

In S130 of the processing method, the violation of the safety envelope is monitored. S130 includes S131 to S134. In S131, the safety determination is performed. For example, in the safety determination, it is determined whether the safety range set for the host vehicle 2 and the safety range set for the target moving object 3 overlap each other. When the safety ranges overlap each other, it is determined that there is a violation of the safety envelope. The safety determination is performed for each target moving object 3.

Specifically, the overlap of the safety ranges determined as the violation of the safety envelope can be considered to be overlap between the safety ranges in stop. Even when the safety range in stop and the safety range in passing overlap each other, it may be determined that there is a violation of the safety envelope. Further, when the safety ranges in passing overlap each other, it may also be determined that there is a violation of the safety envelope.

In S132 of the processing method, the acceleration a is evaluated. In S132, the acceleration a is evaluated by the same manner as in S112.

S123 and S133 of the processing method are independent of S122 to S132. S123 and S133 may be executed in parallel with S122 to S132. S123 and S133 may be executed before or after S122 to S132.

In S123, the limit value of the speed v is determined. Processing in S123 is the same as that in S106. Therefore, the limit value of the speed v includes the speed limit of the road on which the vehicles are traveling. The road means a place where the vehicles may travel, and a parking lot is also included in the road. When the host vehicle 2 is traveling in a parking lot, for example, when there is a speed limit marking in the parking lot, the speed limit of the parking lot can be acquired in S102. In S133, the speed v is evaluated. Processing in S133 is the same as that in S113.

In S134 of the processing method, an evaluation result in S132 and an evaluation result in S133 are output. The evaluation results are given to the control block 160. The evaluation results may be included in the determination information and given to the control block 160. The determination information includes a result of the safety determination executed in S131. The determination information may include one of the first action, the second action, and the third action described above.

Summary of First Embodiment

In the first embodiment, in the processing method executed by the risk monitoring block 140, whether the rule for setting the safety distance $d_{min}$ is the standard rule or the restriction rule is determined based on whether the application condition is satisfied (S104, S121). Therefore, the safety violation can be monitored by setting an appropriate safety distance $d_{min}$.

The restriction rule includes a switching rule that may be applied when the road on which the host vehicle 2 is traveling is the road having the lane structure 8. The switching rule includes a rule that the target vehicle 3a is traveling in compliance with the regulation established for the road traveling. By calculating the safety distance $d_{min}$ with application of the switching rule, it is possible to limit setting of an unnecessarily long safety distance $d_{min}$.

The restriction rule includes a free space restriction rule that may be applied when the road on which the host vehicle 2 is traveling is a road having no lane structure 8. An example of the free space restriction rule is the entering and exiting rule. The entering and exiting rule is applied when performing the entering and exiting operation with respect to the parking space 92.

If the free space standard rule is applied when performing the entering and exiting operation of the host vehicle 2 or the target vehicle 3a, the traveling direction of the entering and exiting vehicle among the host vehicle 2 and the target vehicle 3a can change greatly in a short time. Therefore, in the safety range set for the entering and exiting vehicle, an orientation can also change greatly in a short time. Depending on the orientation of the safety range of the entering and exiting vehicle, the safety range of the other vehicle may become a position where the entering and exiting vehicle needs to be stopped.

On the other hand, in the processing method according to the present embodiment, when the entering and exiting rule is applied, the safety range for the entering and exiting vehicle located in the vicinity of the parking space 92 is set as a fixed range determined with respect to the parking space 92. Accordingly, since possibility that the safety range of the other vehicle becomes a position where the entering and exiting vehicle needs to be stopped is reduced, the entering and exiting vehicle can enter and exit smoothly.

In the processing method according to the first embodiment, the limit value for the acceleration a includes a limit value for safely stopping the vehicle in order to comply with the regulation. Therefore, the host vehicle 2 can safely stop while complying with the regulation.

In the processing method according to the first embodiment, the limit value for the speed v includes the speed limit of the road on which the host vehicle 2 travels. Therefore, the host vehicle 2 can be limited from traveling at a speed that does not comply with the regulation.

Second Embodiment

A second embodiment is a modification of the first embodiment.

In the second embodiment, contents of an entering and exiting rule are different from the entering and exiting rule described in the first embodiment in the following points. The entering and exiting rule in the second embodiment is different in safety distance to be set depending on whether the target moving object 3 is a person or a vehicle. The entering and exiting rule in the second embodiment is the same as that in the first embodiment when the target moving object 3 is the target vehicle 3a.

Figure 27:
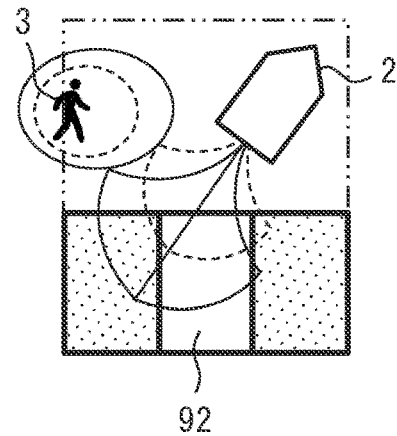
FIG. 27 is a diagram illustrating a safety range set according to an entering and exiting rule according to a second embodiment.

On the other hand, when the target moving object 3 is a person, a safety range for the person is the same as the safety range set when the target moving object 3 is a person by applying the standard rule on the road having no structure. FIG. 27 illustrates a case where the target moving object 3 is a person. Both a safety range set for the host vehicle 2 and the safety range set for the person follow the standard rule.

In FIG. 27, for comparison, the safety range shown by the solid lines in FIG. 26 is shown by a two-dot chain line. The safety range shown by the two-dot chain line overlaps the safety range set for the person. Therefore, the host vehicle 2 needs to be stopped.

However, if a free space standard rule is followed when the target moving object 3 is a person as in the second embodiment, the safety range set for the target vehicle 3a and the safety range set for the person are less likely to overlap each other. Therefore, the host vehicle 2 is likely to continue a parking operation.

Third Embodiment

A third embodiment is a modification of the first embodiment.

In the third embodiment, contents of an entering and exiting rule are different from the entering and exiting rule described in the first embodiment in the following points. The entering and exiting rule in the third embodiment is different from the entering and exiting rule in the first embodiment in terms of a safety range set for an entering and exiting vehicle.

Figure 28:
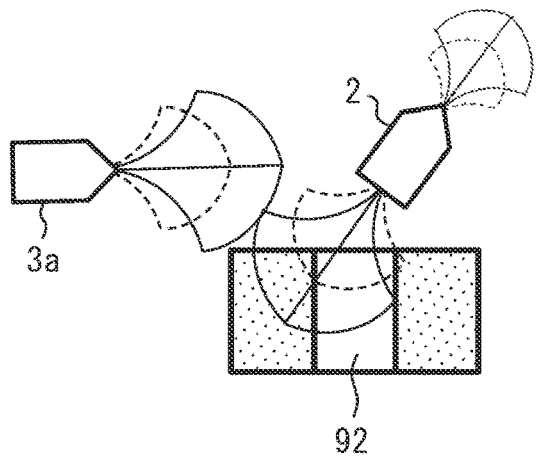
FIG. 28 is a diagram illustrating a safety range set according to an entering and exiting rule according to a third embodiment.

In the third embodiment, as illustrated in FIG. 28, a safety range in stop and a safety range in passing are set not only in front but also in rear of a traveling direction of the entering and exiting vehicle. The safety range in stop and the safety range in passing set in front of the traveling direction are the same as the safety range in stop and the safety range in passing set based on the free space standard rule. The safety range in stop and the safety range in passing set in rear of the traveling direction may be set to be smaller than the corresponding safety ranges set in front of the traveling direction. One example of the smaller size is obtained by multiplying the corresponding safety ranges in front of the traveling direction by a fixed coefficient smaller than 1.

In FIG. 28, the host vehicle 2 is the entering and exiting vehicle. When the safety range in stop and the safety range in passing are set not only in front but also in rear of the traveling direction while the host vehicle 2 is entering and exiting, it is possible to limit the target vehicle 3a from becoming too close to interrupt a parking operation of the host vehicle 2 as compared with the case where the safety range is set only in front of the traveling direction.

Fourth Embodiment

A fourth embodiment is a modification of the first embodiment.

Figure 29:
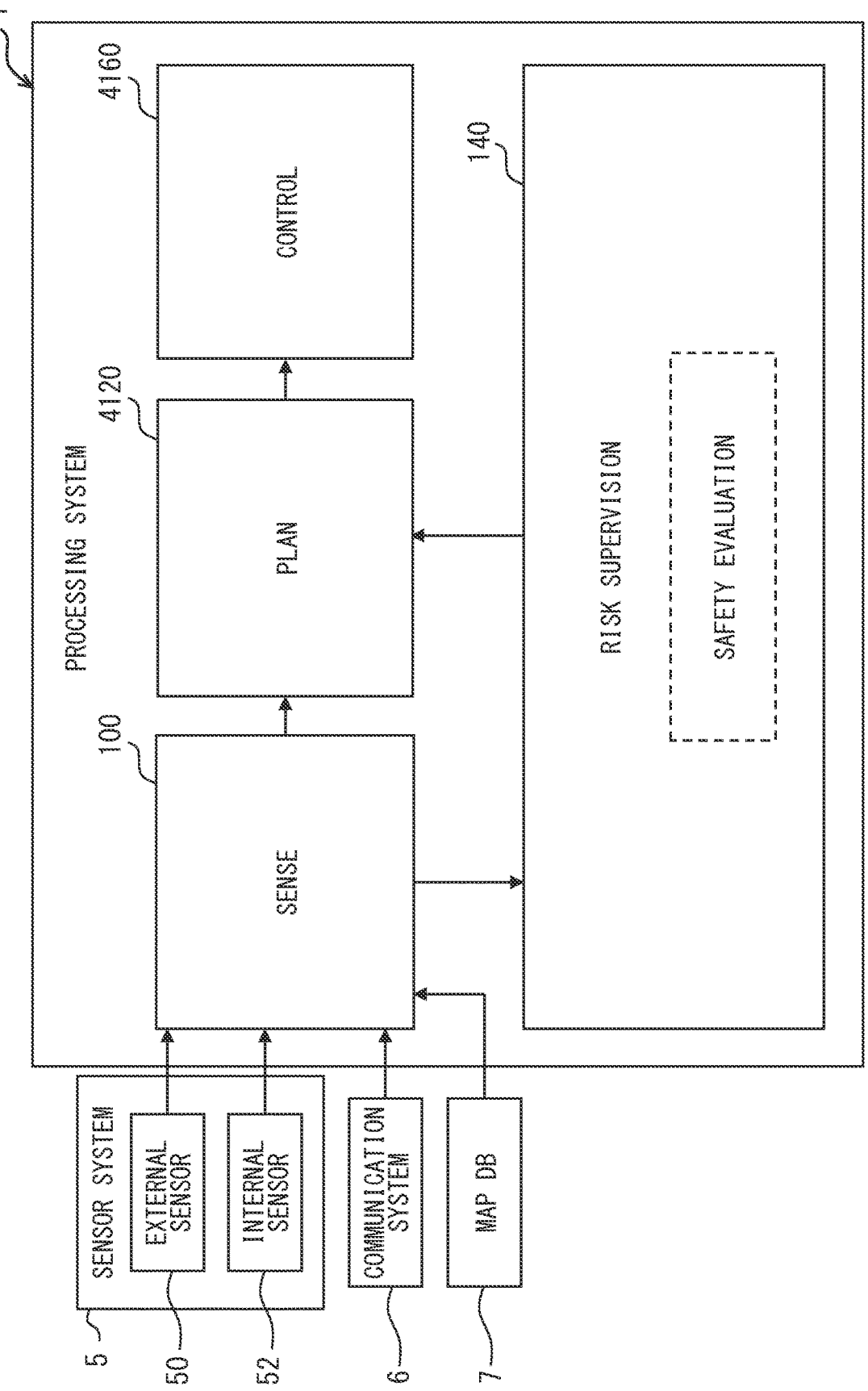
FIG. 29 is a block diagram illustrating a processing system according to a fourth embodiment.

As illustrated in FIG. 29, in a control block 4160 in the fourth embodiment, the processing of acquiring the determination information related to the safety envelope from the risk monitoring block 140 is omitted. Therefore, a planning block 4120 in the fourth embodiment acquires the determination information related to the safety envelope from the risk monitoring block 140. The planning block 4120 plans driving control of the host vehicle 2 according to the planning block 120 when the determination information indicating that there is no violation of the safety envelope is acquired. On the other hand, when the determination information indicating that there is a violation of the safety envelope is acquired, the planning block 4120 gives a constraint based on the determination information for the driving control at the stage of planning the driving control according to the planning block 120. That is, the planning block 4120 limits the driving control to be planned. In either case, the control block 4160 executes the driving control of the host vehicle 2 planned by the planning block 4120.

Fifth Embodiment

A fifth embodiment is a modification of the first embodiment.

Figure 30:
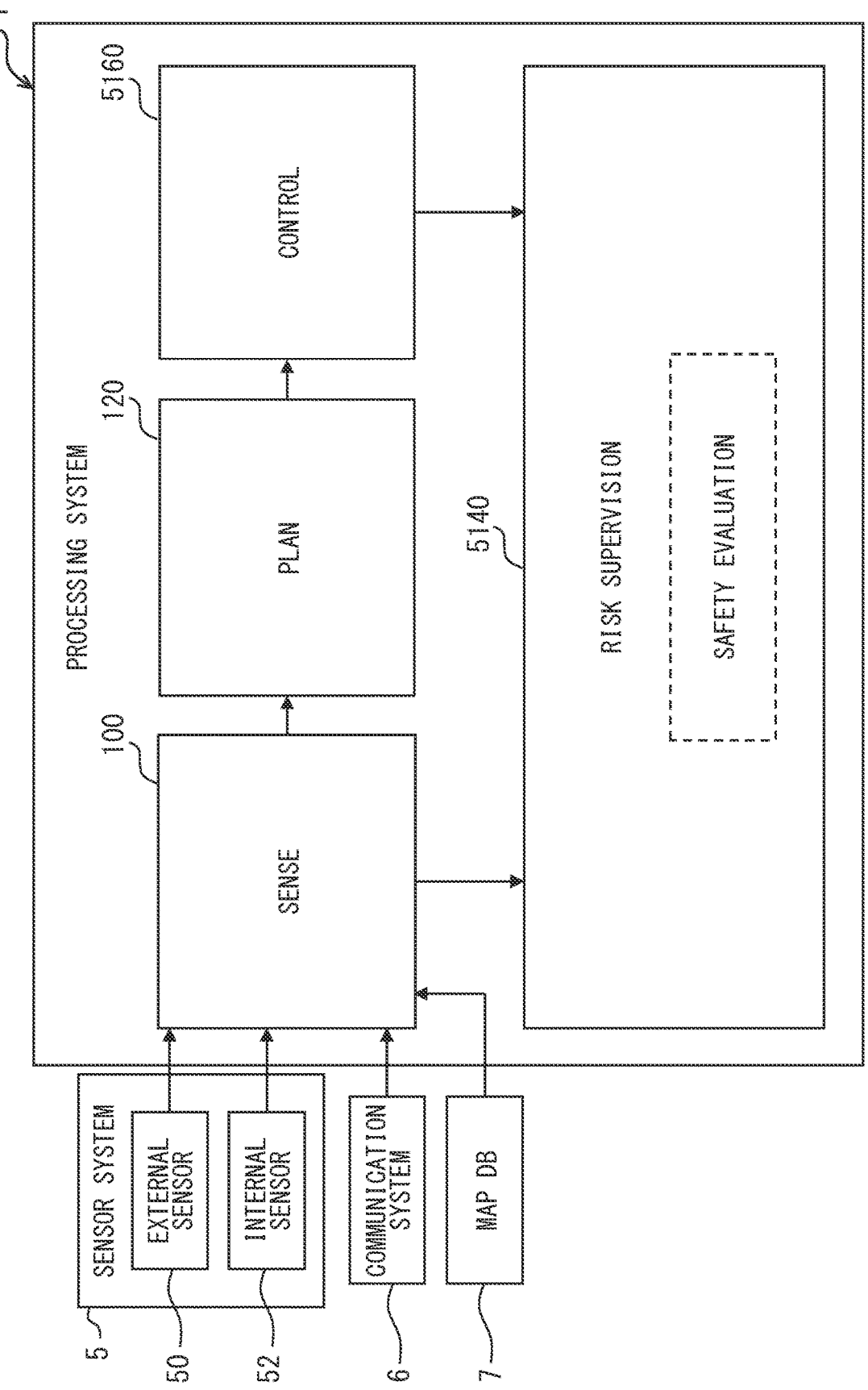
FIG. 30 is a block diagram illustrating a processing system according to a fifth embodiment.

As illustrated in FIG. 30, in a control block 5160 in the fifth embodiment, the processing of acquiring the determination information related to the safety envelope from a risk monitoring block 5140 is omitted. Therefore, the risk monitoring block 5140 in the fifth embodiment acquires information indicating a result of the driving control executed by the control block 5160 for the host vehicle 2. The risk monitoring block 5140 evaluates the driving control by executing safety evaluation based on the safety envelope on the result of the driving control.

Sixth Embodiment

A sixth embodiment is a modification of the first and fifth embodiments.

Figure 31:
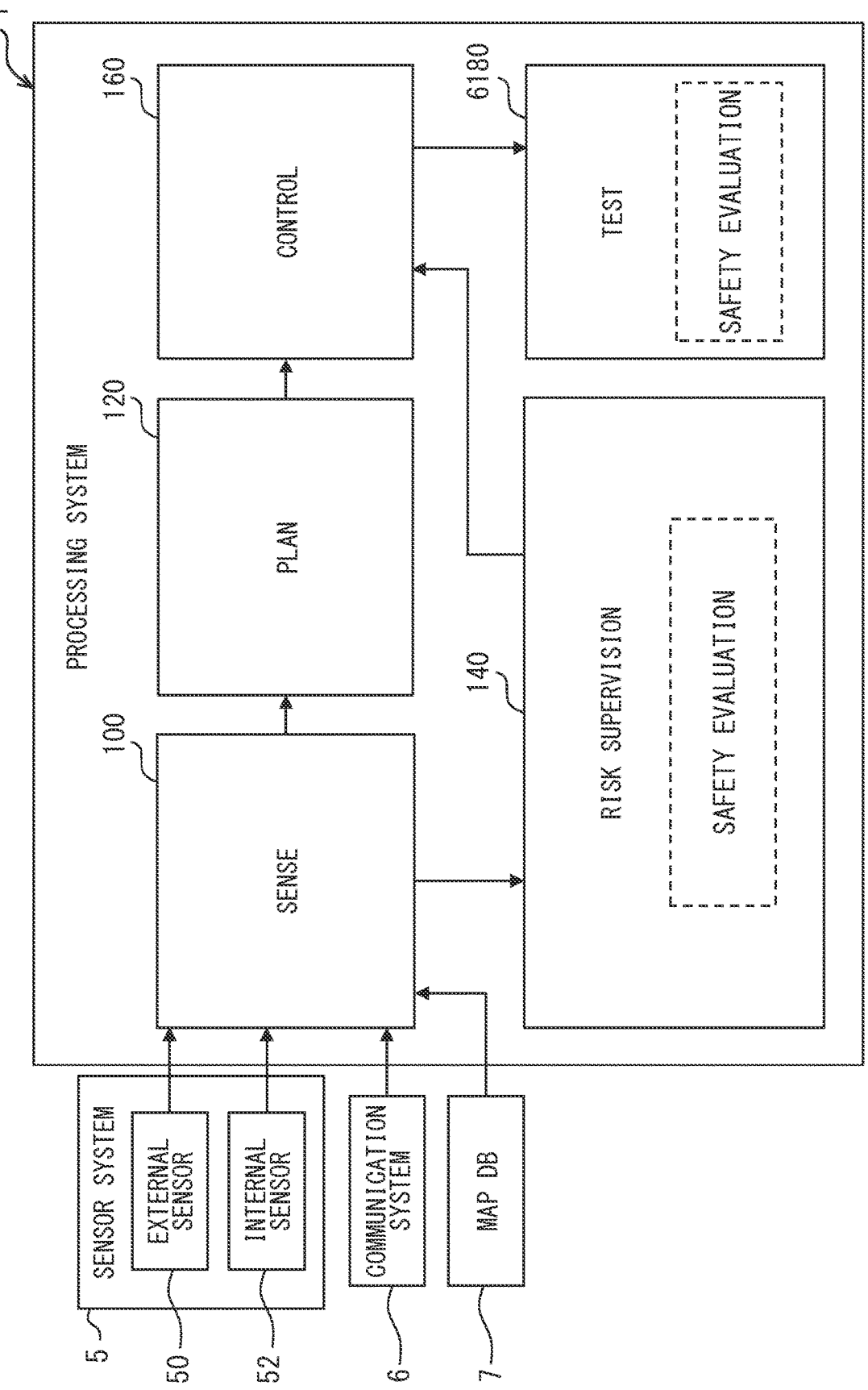
FIG. 31 is a block diagram illustrating a processing system according to a sixth embodiment.

As illustrated in FIGS. 31 and 32, from a viewpoint of the processing system 1, a test block 6180 for testing the driving control by the processing system 1 for, for example, safety permission or the like is added to the sixth embodiment, which is a modification of the first embodiment. Functions equivalent to the detection block 100 and the risk monitoring block 140 are given to the test block 6180. In FIGS. 31 and 32, a data acquisition path for monitoring and determining a failure in detection information is not illustrated.

The test block 6180 may be constructed by the processing system 1 illustrated in FIG. 31 executing a test program added to a processing program for constructing each of the blocks 100, 120, 140, and 160. The test block 6180 may be constructed by a test processing system 6001 different from the processing system 1 illustrated in FIG. 32 executing a test processing program different from the processing program for constructing each of the blocks 100, 120, 140, and 160. The test processing system 6001 may include at least one dedicated computer including the memory 10 and the processor 12, which are connected to the processing system 1 (not illustrated in a case of connection via the communication system 6) in order to test the driving control.

Safety determination by the test block 6180 may be executed each time one control cycle of information indicating a result of the driving control is stored in the memory 10 of the processing system 1 or the processing system 6001. The safety determination by the test block 6180 may be executed each time multiple control cycles are stored in the memory 10.

Other Embodiments

Although the multiple embodiments have been described above, the present disclosure is not construed as being limited to these embodiments, and can be applied to various embodiments and combinations within a scope that does not depart from the spirit of the present disclosure.

In the embodiments, the standard rule may be a rule that defines a condition based on a reasonable and foreseeable assumption. When the standard rule is used, a switching rule to be switched may be a rule that defines a condition severer than the standard rule for the host vehicle 2, for example, a condition for minimizing an unreasonable risk. When the standard rule is used, the switching rule to be switched may be a rule that defines a condition that is more relaxed than the standard rule for the host vehicle 2.

The restriction rule may be set using at least one of selection of a specific scenario and scene and an area to which a specific regulation is applied as an application condition. For example, a restriction rule applied to a road having a structure with regional characteristics such as a roundabout and a Michigan left may be set.

In the embodiments, the free space standard rule may be a positioning of the restriction rule applied when an application condition that the host vehicle 2 is traveling on a road having no structure is established, as opposed to the normal standard rule.

In the embodiments, the attributes of the safety-related model for defining the rule may include the following attributes. The safety-related model may correspond to a concept of an acceptable risk. A level of the acceptable risk may be determined by a regulation or may be set by a developer of an automated driving system. The safety-related model may be able to provide a comprehensive range of a reasonably foreseeable scenario in an operational design domain. The safety-related model used in the dynamic driving task may be focused on only the action and the motion control, and may not include the detection. The safety-related model may incorporate an assumption related to a behavior of another safety-related object (road user). In the safety-related model, a road user (initiator) that cases a hazardous scenario and a road user (responder) that responds to a hazardous scenario may be differentiated from each other. The safety-related model may be able to generate a reproducible action having consistency. The safety-related model may be able to maintain usability of the host vehicle 2 in the operational design domain. The safety-related model may enable ability of a vehicle equipped with an automated driving system for driving in a method of supporting coexistence with a human driver (in other words, for performing natural driving), or may at least not prohibit the ability. The safety-related model may be based on understanding of a current position, a traveling direction, and a speed of the other safety-related object using a reasonably foreseeable assumption. The safety-related model may support possibility that the safety-related object does not always move linearly, but moves in various directions. The safety-related model may support scenarios related to occlusion of a field of view. The safety-related model may indicate reasonable attention suitable for the operational design domain of the vehicle equipped with the automated driving system while maintaining the usability. The safety-related model may incorporate a widely accepted axiom that a right-of-way is given and is not taken. The safety-related model may be set in consideration of a case where a human road user violates a traffic rule in a specific scenario. The safety-related model may support a theoretical a theoretical outcome of no collisions within the bounds of the assumptions about reasonably foreseeable behaviors of other road users. The safety-related model may support a method based on empirical evidence for defining a reasonably foreseeable operation of the other safety-related object.

The safety-related model may be set in consideration of a regional difference in action, that is, a local traffic custom. At least one of the limit value for the acceleration and the limit value for the speed, which are used for monitoring the violation of the safety envelope, may be a limit value for traveling in compliance with a regional traffic custom, instead of the regulation established for the road traveling.

The safety-related model may be designed such that output conflict cannot be caused. When an proper response and a traffic rule such as a regulation contend with each other, the safety-related model and the standard rule and the restriction rule based on the safety-related model may be configured to execute prioritizing processing for solving the contention or cause a processor to execute the processing in order to solve a risk in safety.

The safety-related model may be able to track a high level action so as to associate the high-level action with a specific parameter used in the safety-related model. The specific parameter may be a parameter used for setting the safety envelope such as a safety distance, a speed, an acceleration, a response time, a limit value of the speed, and a limit value of the acceleration.

The safety-related model may support multiple different safety-related objects. For example, since the pedestrian and the vehicle have different action and assumption, it is preferable that the safety-related model not only recognize a difference between different safety-related object perceptions, but also supports a dynamic range of objects of different numbers and classes.

The safety-related model may be configured to allow a formal verification technique for providing a strong evidence, and to be expressible by a formal notation in order to generate a result having reproducibility of a verification method. All or a part of the expression by the formal notation may be an expression using a rule in which the attributes of the safety-related model are embodied, such as an expression using the standard rule and an expression using the restriction rule.

In the embodiment, the processing system 1 may not be configured to switch between the standard rule and the restriction rule. For example, the processing system 1 may switch between a standard safety model and a limited safety model applied when the application condition is satisfied instead of switching between the standard rule and the restriction rule, or in combination with switching between the standard rule and the restriction rule. The processing system 1 may switch between a standard driving policy and a limited driving policy applied when the application condition is satisfied instead of switching between the standard rule and the restriction rule, or in combination with switching between the standard rule and the restriction rule.

In the embodiment, the dedicated computer constituting the processing system 1 may include at least one of a digital circuit and an analog circuit as a processor. The digital circuit is at least one of, for example, an application specific integrated circuit (ASIC), a field programmable gate array (FPGA), a system on a chip (SOC), a programmable gate array (PGA), and a complex programmable logic device (CPLD). Such a digital circuit may include a memory storing a program.

The invention claimed is:

1. A processing method executed by a processor to perform processing related to driving control of a host vehicle, the processing method comprising:
    acquiring detection information describing a state detected in a traveling environment of the host vehicle;
    determining a situation to be monitored for the host vehicle based on the detection information;
    setting a safety envelope based on the detection information to include defining a physics-based boundary, margin, or buffer area around the host vehicle;
    monitoring a violation of the safety envelope based on a comparison between the safety envelope and a positional relationship between the host vehicle and a target moving object; and
    determining a rule for setting the safety envelope, which includes a restriction rule to be applied when an application condition is satisfied and a standard rule to be applied when the application condition is not satisfied, based on a determination result of whether the application condition is satisfied, wherein
    the application condition is satisfied when the target moving object is not detected, based on the acquired detection information, in the same lane that the host vehicle is travelling.

2. The processing method according to claim 1, wherein for the target moving object, the restriction rule on a road having a structure includes a rule that a target vehicle is traveling in compliance with a regulation set for road traveling.

3. The processing method according to claim 1, wherein the restriction rule on a road having no structure is a rule applied when a vehicle operation set in advance is performed on the road having no structure.

4. The processing method according to claim 3, wherein the restriction rule is a rule applied when an entering and exiting operation at a parking space is being performed.

5. The processing method according to claim 1, wherein setting the safety envelope includes setting a safety distance or determining the boundary, the margin, or the buffer area based on the safety distance.

6. The processing method according to claim 1, wherein
the restriction rule is a rule based on an assumption that the target moving object travels in compliance with a regulation, and
a more relaxed restriction is applied during the restriction rule than the standard rule.

7. The processing method according to claim 1, wherein the application condition is satisfied when a blind spot area exists within a detection range based on the acquired detection information detected by a sensor.

8. The processing method according to claim 1, wherein
the restriction rule for a non-structure road is a rule that is defined by changing the standard rule to set the safety envelope as a fixed range, and
the restriction rule is applied when a predetermined vehicle operation is performed on the non-structure road.

9. A processing method executed by a processor to perform processing related to driving control of a host vehicle, the processing method comprising:
acquiring detection information describing a state detected in a traveling environment of the host vehicle;
selecting, among a plurality of predetermined scenarios, one scenario to be monitored for the host vehicle based on the detection information;
setting a safety envelope based on the detection information to include defining a physics-based boundary, margin, or buffer area around the host vehicle;
setting a limit value for an acceleration based on the safety envelope and a positional relationship between the host vehicle and a target vehicle; and
monitoring a violation of the safety envelope based on a simulation of the selected scenario including a comparison between the limit value for the acceleration and an acceleration of the host vehicle and a comparison between a speed of the host vehicle and a limit value for the speed, wherein
at least one of the limit value for the acceleration and the limit value for the speed is a limit value for traveling in compliance with a regulation set for road traveling.

10. The processing method according to claim 9, wherein the limit value for the acceleration includes a limit value for stopping to comply with the regulation.

11. The processing method according to claim 9, wherein the limit value for the speed includes a speed limit of a road on which the host vehicle is traveling.

12. A processing system that performs processing related to driving control of a host vehicle, the processing system comprising:
a processor that is configured to:
acquire detection information describing a state detected in a traveling environment of the host vehicle;
determine a situation to be monitored for the host vehicle based on the detection information;
set a safety envelope based on the detection information to include defining a physics-based boundary, margin, or buffer area around the host vehicle;
monitor a violation of the safety envelope based on a comparison between the safety envelope and a positional relationship between the host vehicle and a target moving object; and
determine a rule for setting the safety envelope, which includes a restriction rule to be applied when an application condition is satisfied and a standard rule to be applied when the application condition is not satisfied, based on a determination result of whether the application condition is satisfied, wherein
the application condition is satisfied when the target moving object is not detected, based on the acquired detection information, in the same lane that the host vehicle is travelling.

13. A processing system that performs processing related to driving control of a host vehicle, the processing system comprising:
a processor that is configured to:
acquire detection information describing a state detected in a traveling environment of the host vehicle;
selecting, among a plurality of predetermined scenarios, one scenario to be monitored for the host vehicle based on the detection information;
set a safety envelope based on the detection information to include defining a physics-based boundary, margin, or buffer area around the host vehicle;
set a limit value for an acceleration based on the safety envelope and a positional relationship between the host vehicle and a target vehicle; and
monitor a violation of the safety envelope based on simulation of the selected scenario including a comparison between the limit value for the acceleration and an acceleration of the host vehicle and a comparison between a speed of the host vehicle and a limit value for the speed, wherein
at least one of the limit value for the acceleration and the limit value for the speed is a limit value for traveling in compliance with a regulation set for road traveling.

14. A non-transitory, computer readable, tangible storage medium storing a processing program, the processing program comprising an instruction to be executed by a processor to perform processing related to driving control of a host vehicle, the instruction comprising:
acquiring detection information describing a state detected in a traveling environment of the host vehicle;
determining a situation to be monitored for the host vehicle based on the detection information;
setting a safety envelope based on the detection information to include defining a physics-based boundary, margin, or buffer area around the host vehicle;
monitoring a violation of the safety envelope based on a comparison between the safety envelope and a distance between the host vehicle and a target moving object; and
determining a rule for setting the safety envelope, which includes a restriction rule to be applied when an application condition is satisfied and a standard rule to be applied when the application condition is not satisfied, based on a determination result of whether the application condition is satisfied, wherein
the application condition is satisfied when the target moving object is not detected, based on the acquired detection information, in the same lane that the host vehicle is travelling.

15. A non-transitory, computer readable, tangible storage medium storing a processing program, the processing program comprising an instruction to be executed by a processor to perform processing related to driving control of a host vehicle, the instruction comprising:
acquiring detection information describing a state detected in a traveling environment of the host vehicle;
selecting, among a plurality of predetermined scenarios, one scenario to be monitored for the host vehicle based on the detection information;

setting a safety envelope based on the detection information to include defining a physics-based boundary, margin, or buffer area around the host vehicle; and setting a limit value for an acceleration based on the safety envelope and a distance between the host vehicle and a target vehicle; and monitoring a violation of the safety envelope based on simulation of the selected scenario including a comparison between the limit value for the acceleration and an acceleration of the host vehicle and a comparison between a speed of the host vehicle and a limit value for the speed, wherein at least one of the limit value for the acceleration and the limit value for the speed is a limit value for traveling in compliance with a regulation set for road traveling.

* * * * *